No. 793,766. PATENTED JULY 4, 1905.
F. E. BRIGHT.
LINOTYPE MACHINE.
APPLICATION FILED APR. 6, 1905.
15 SHEETS—SHEET 5.
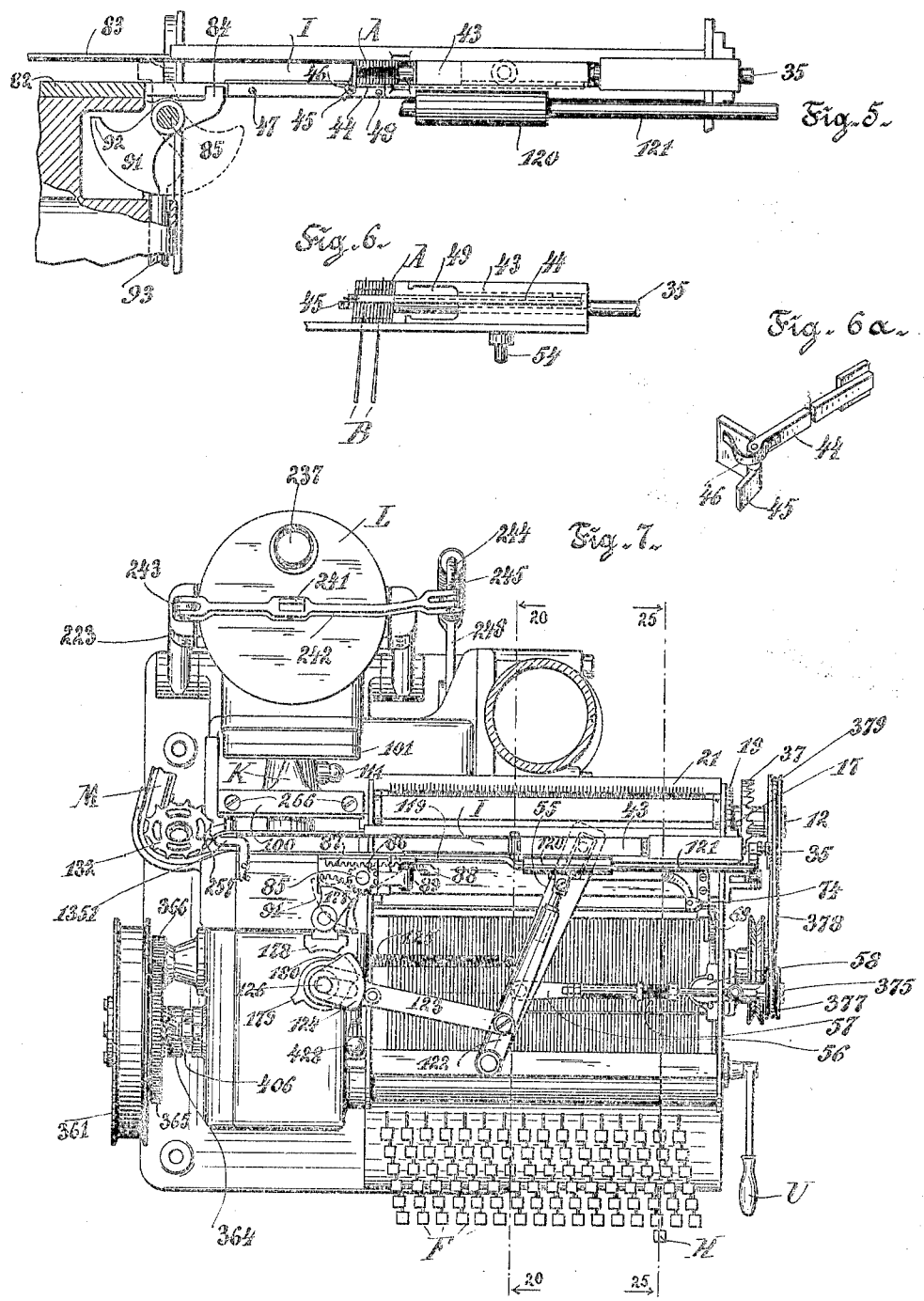

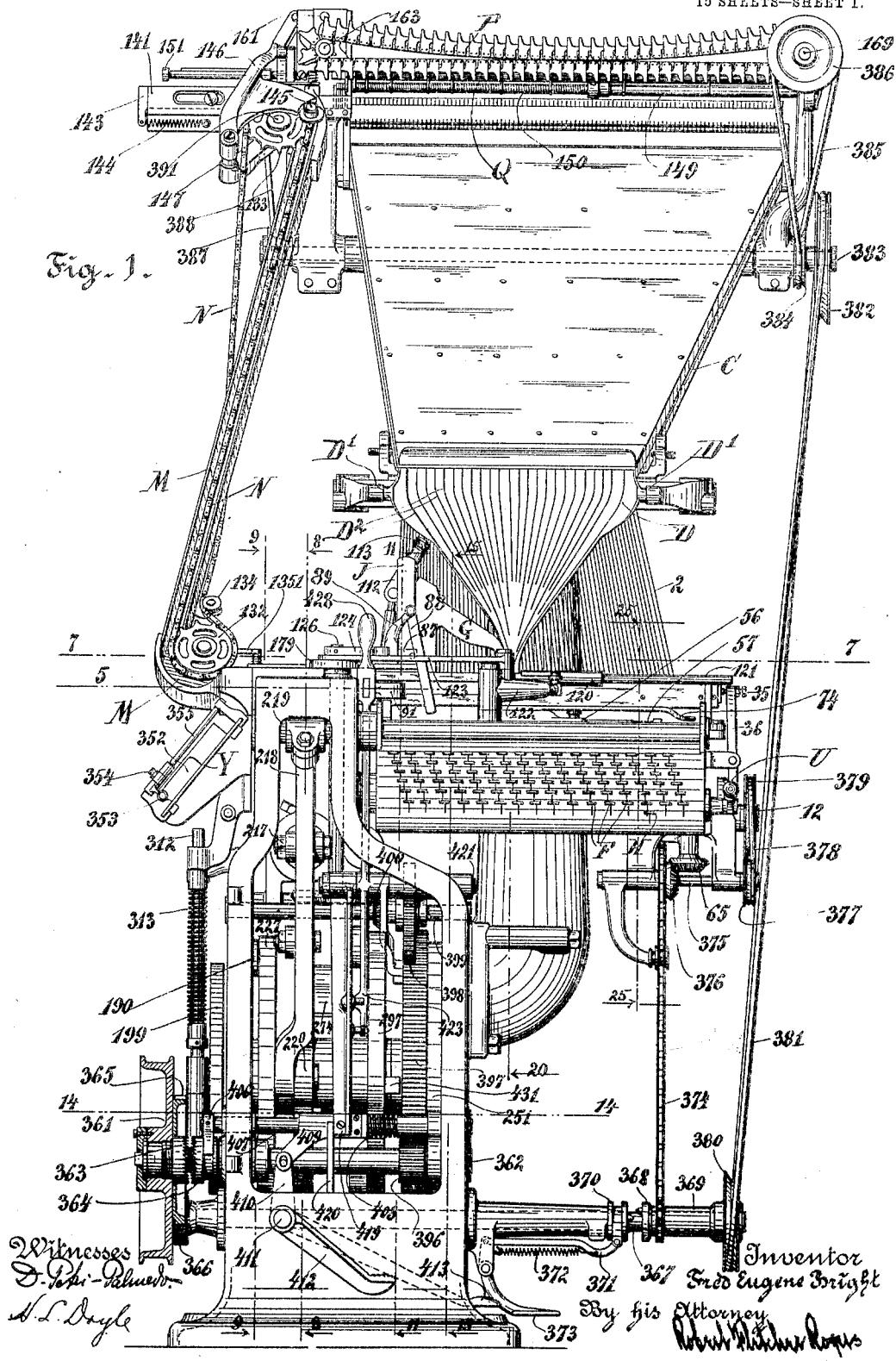

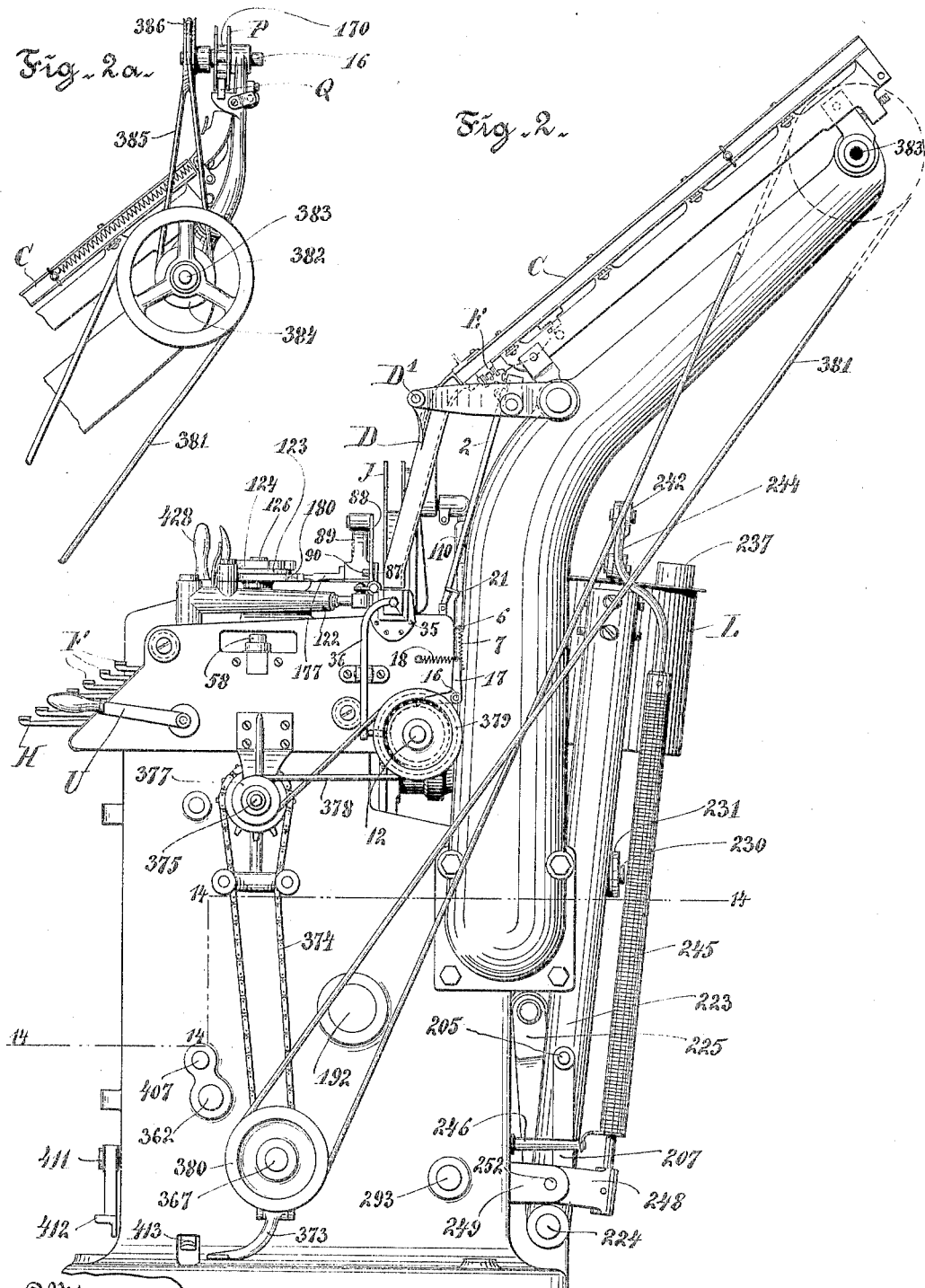

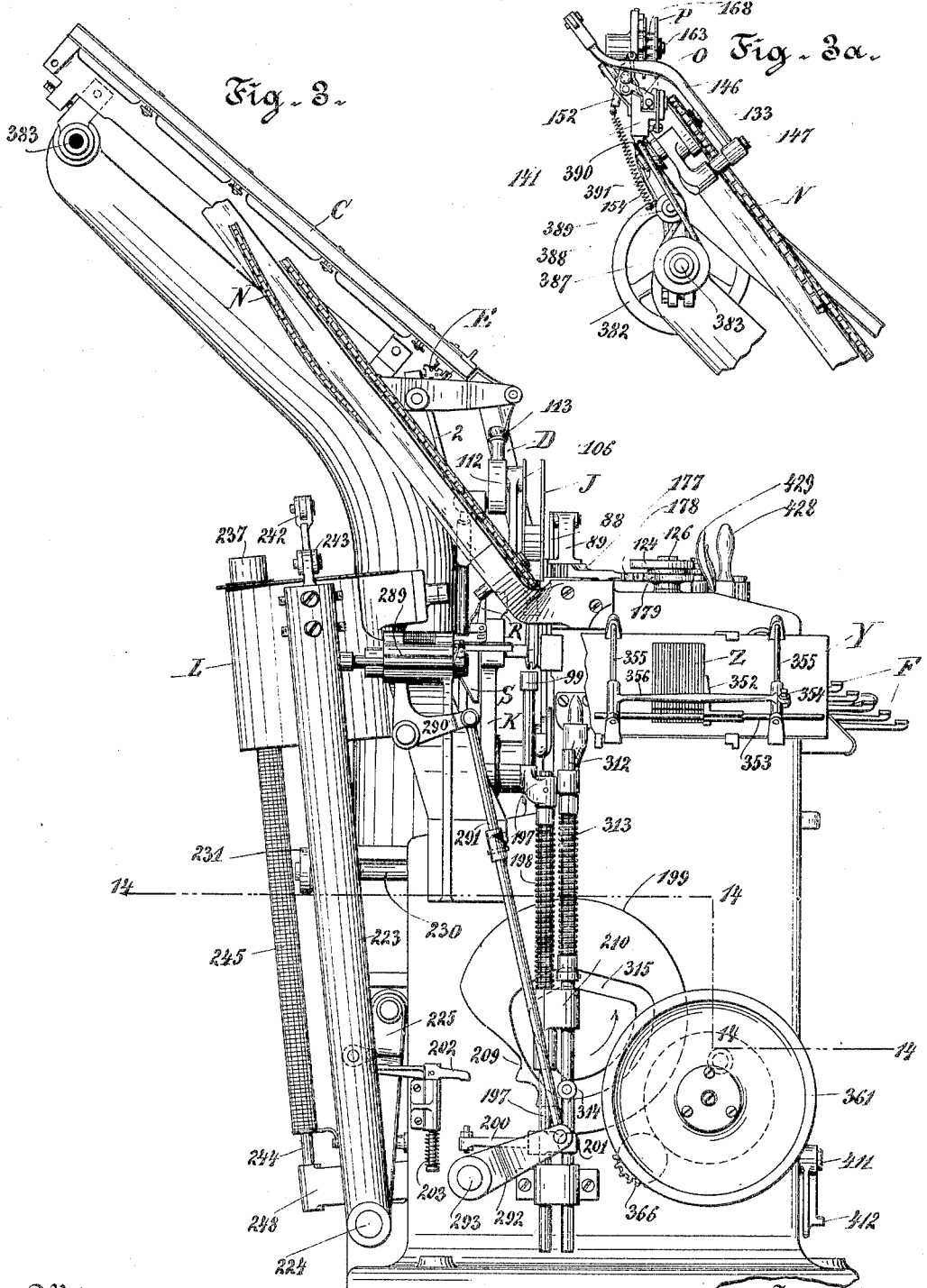

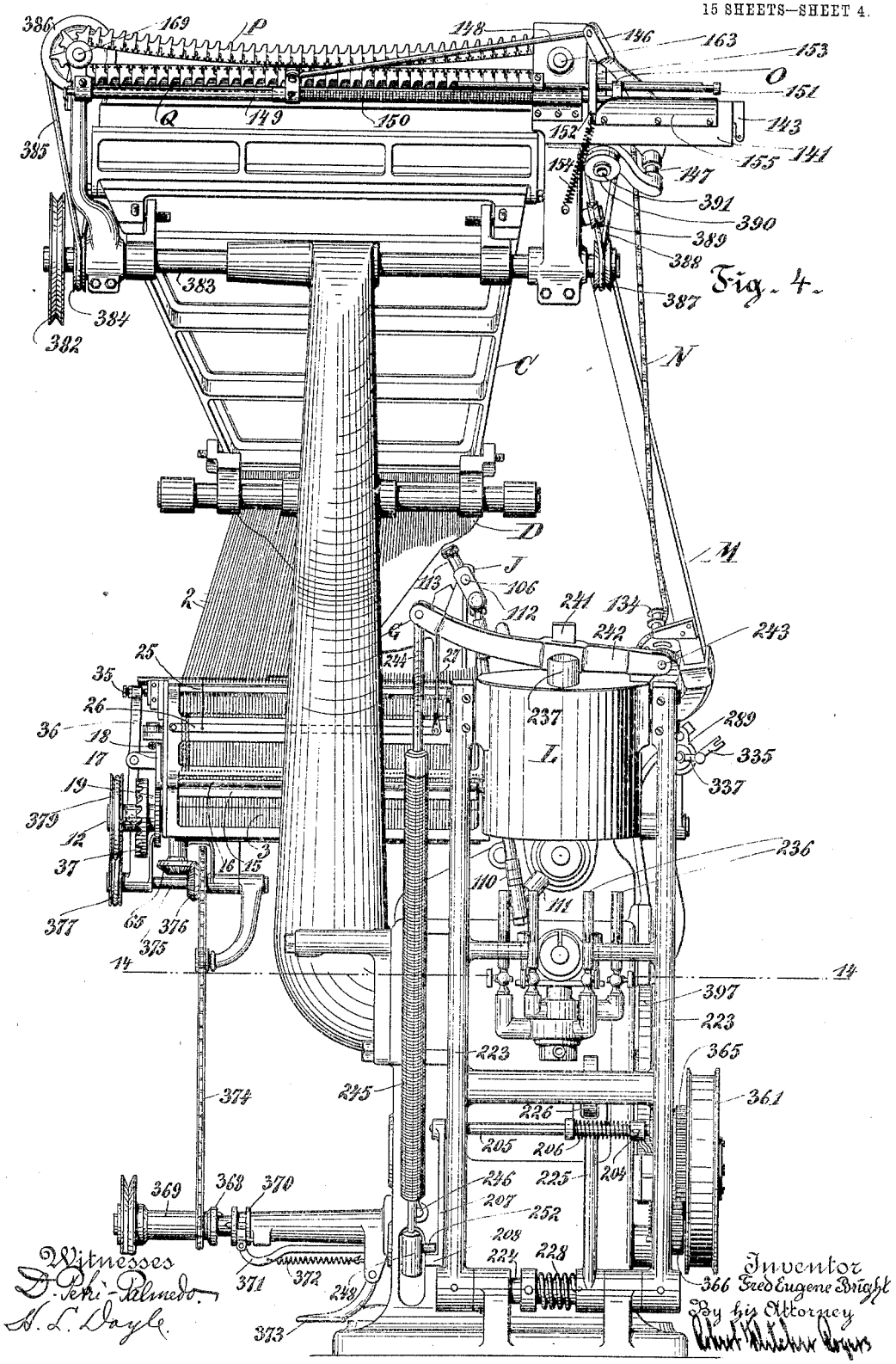

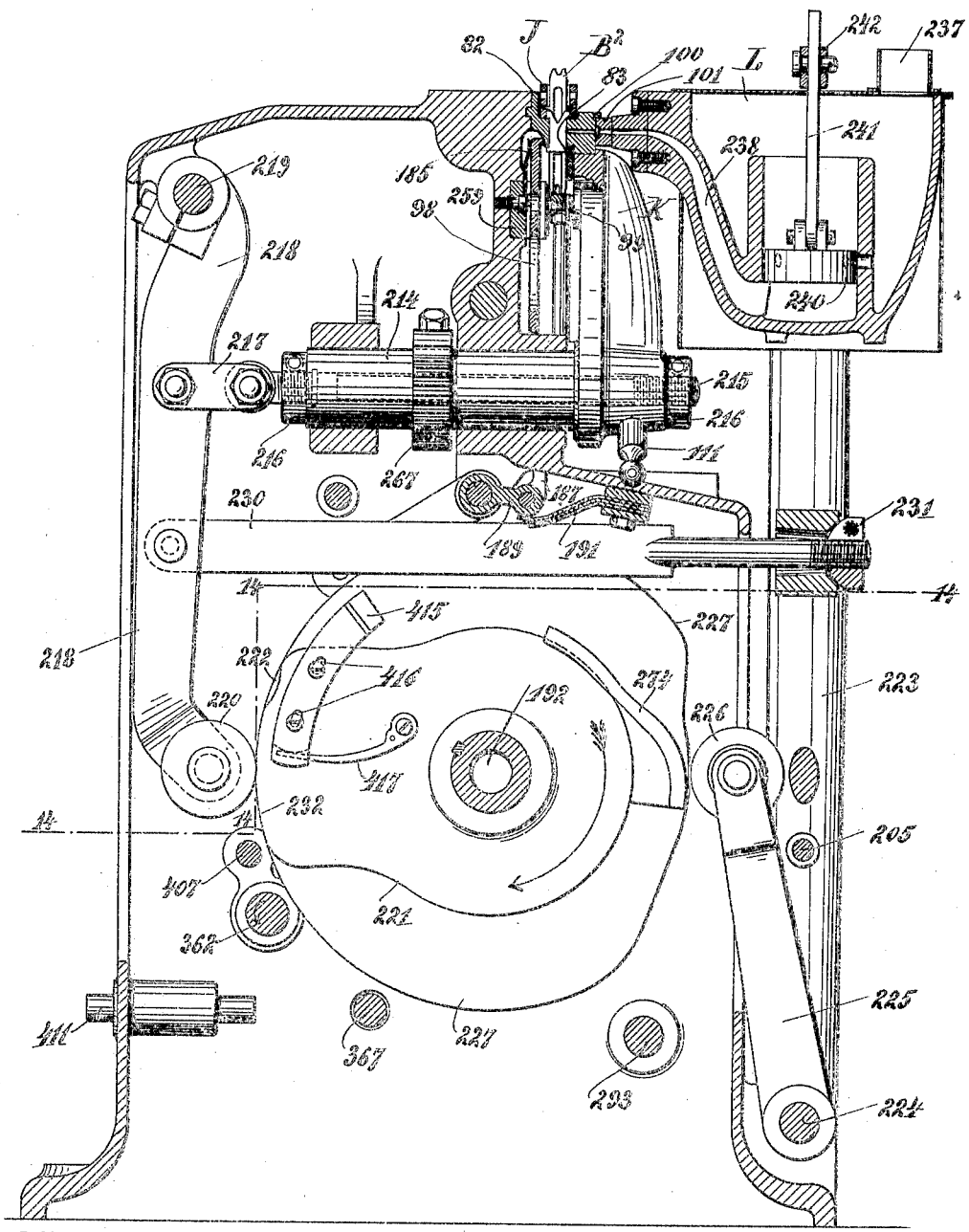

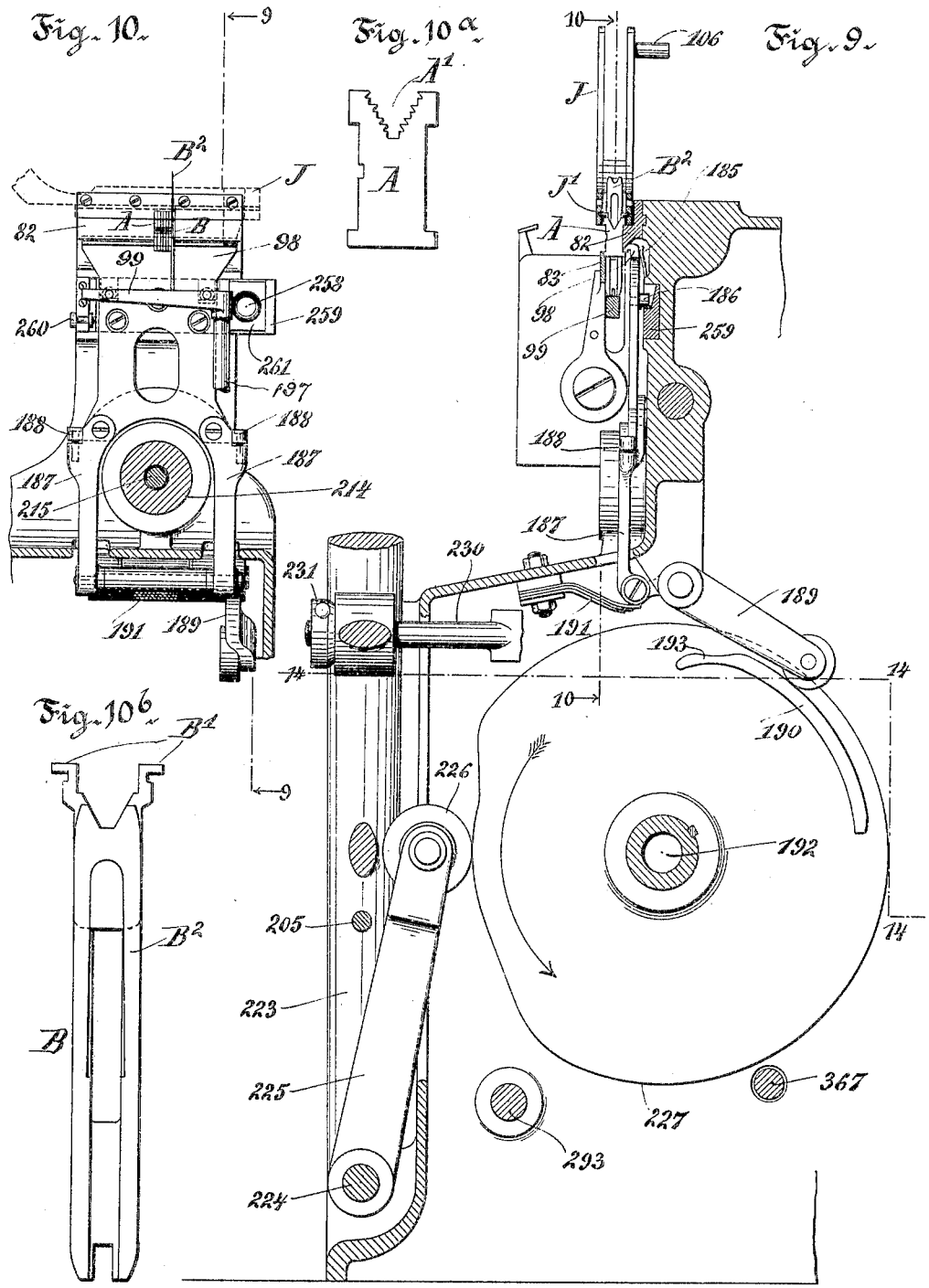

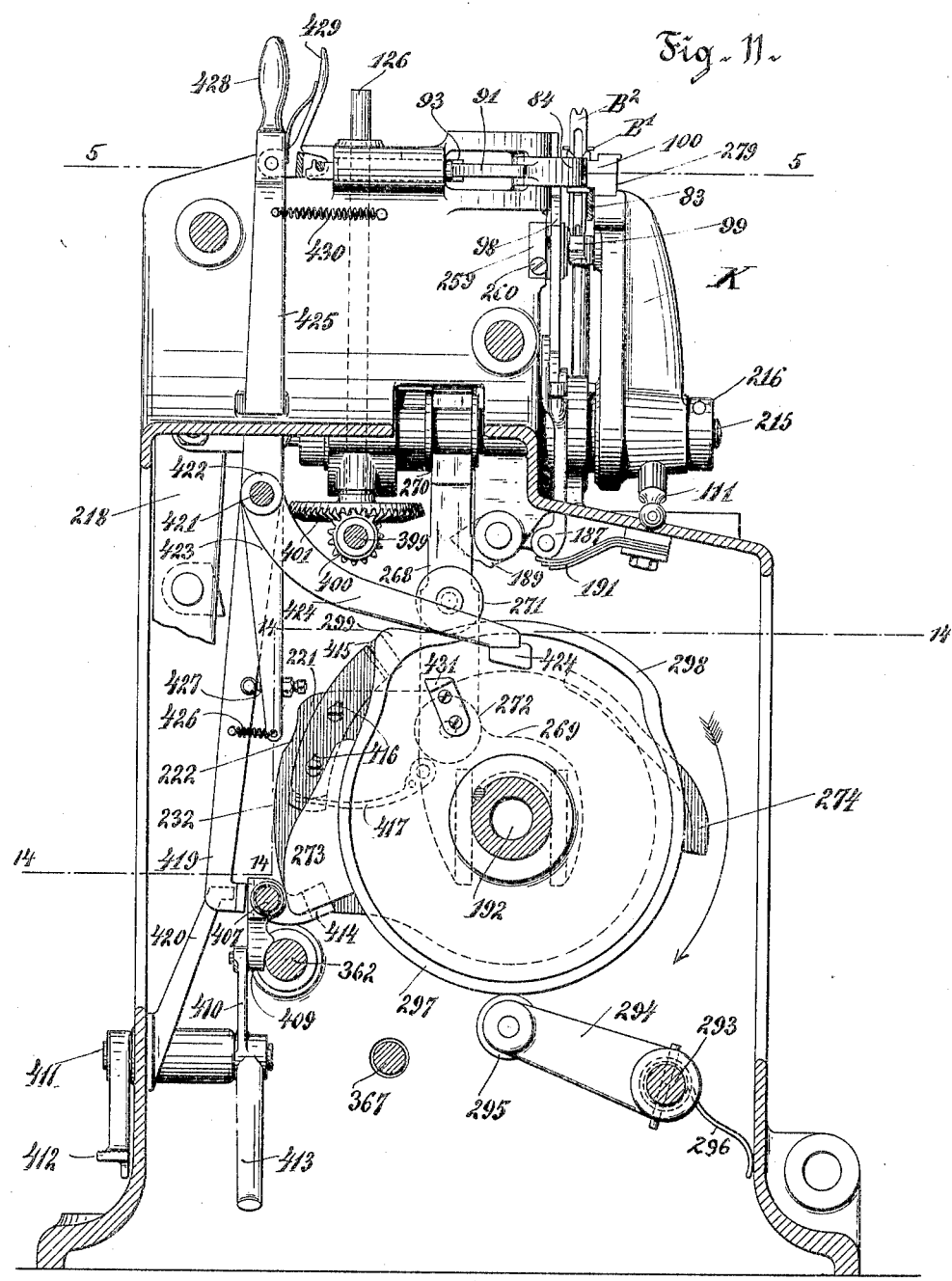

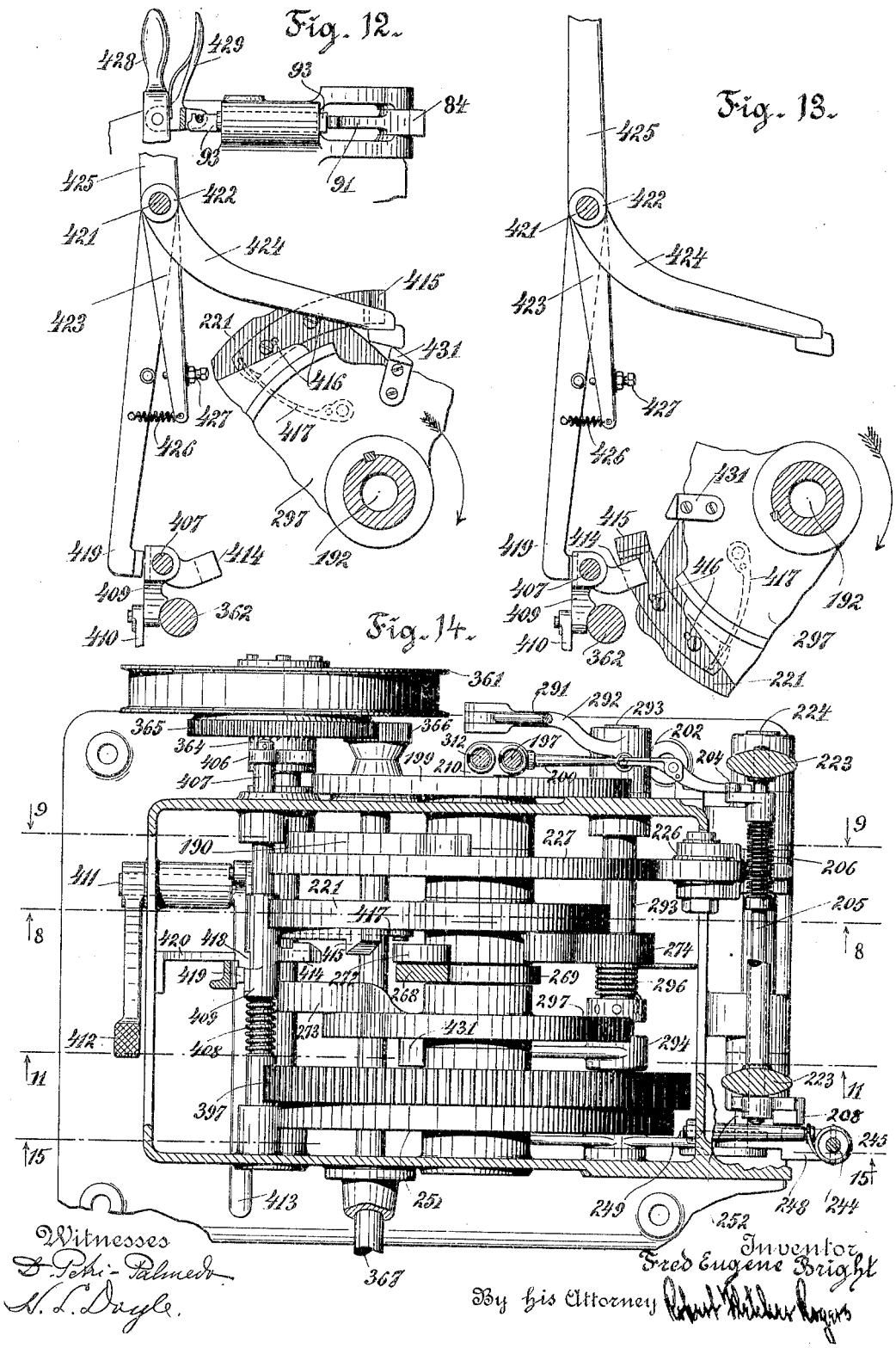

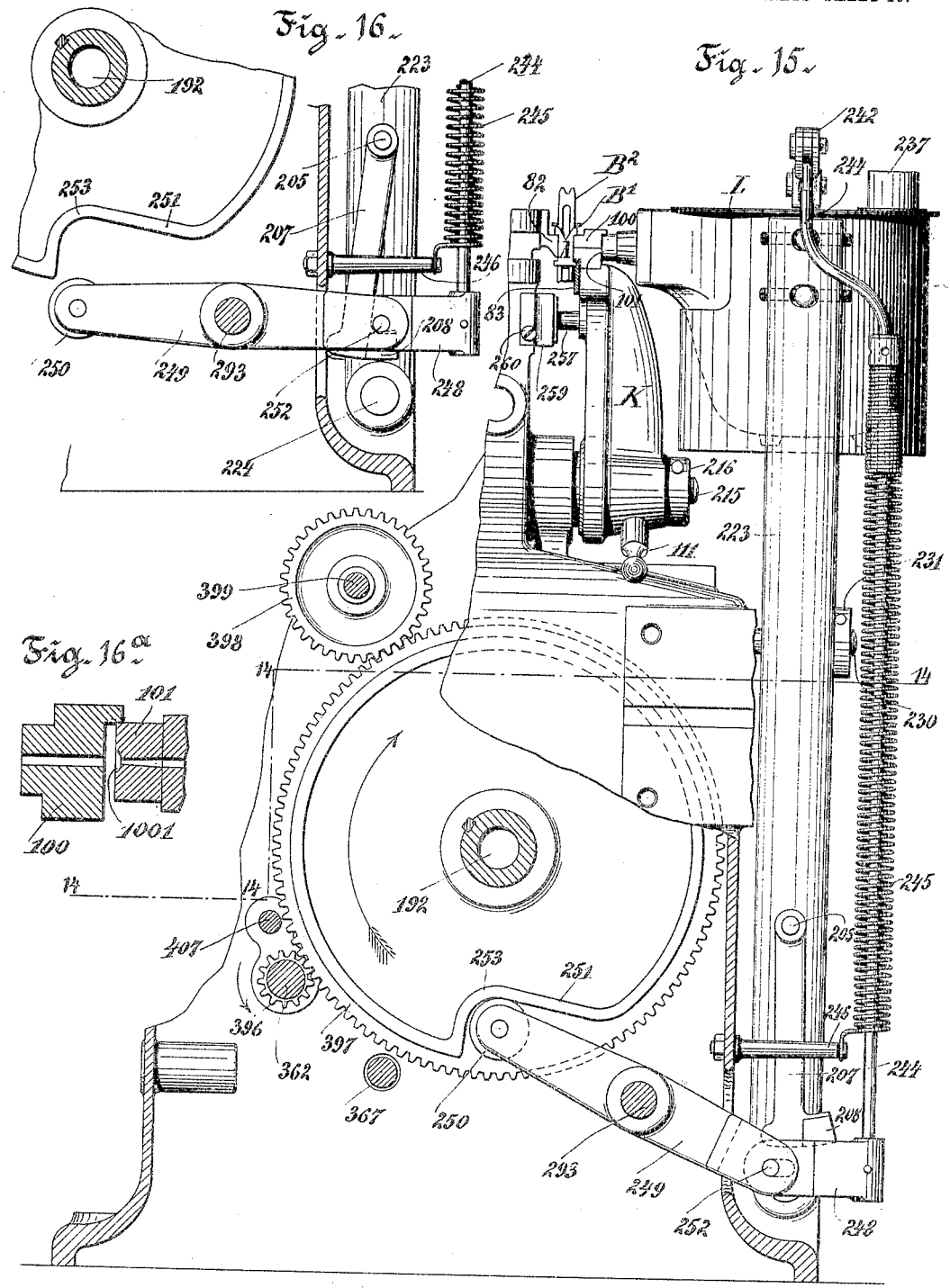

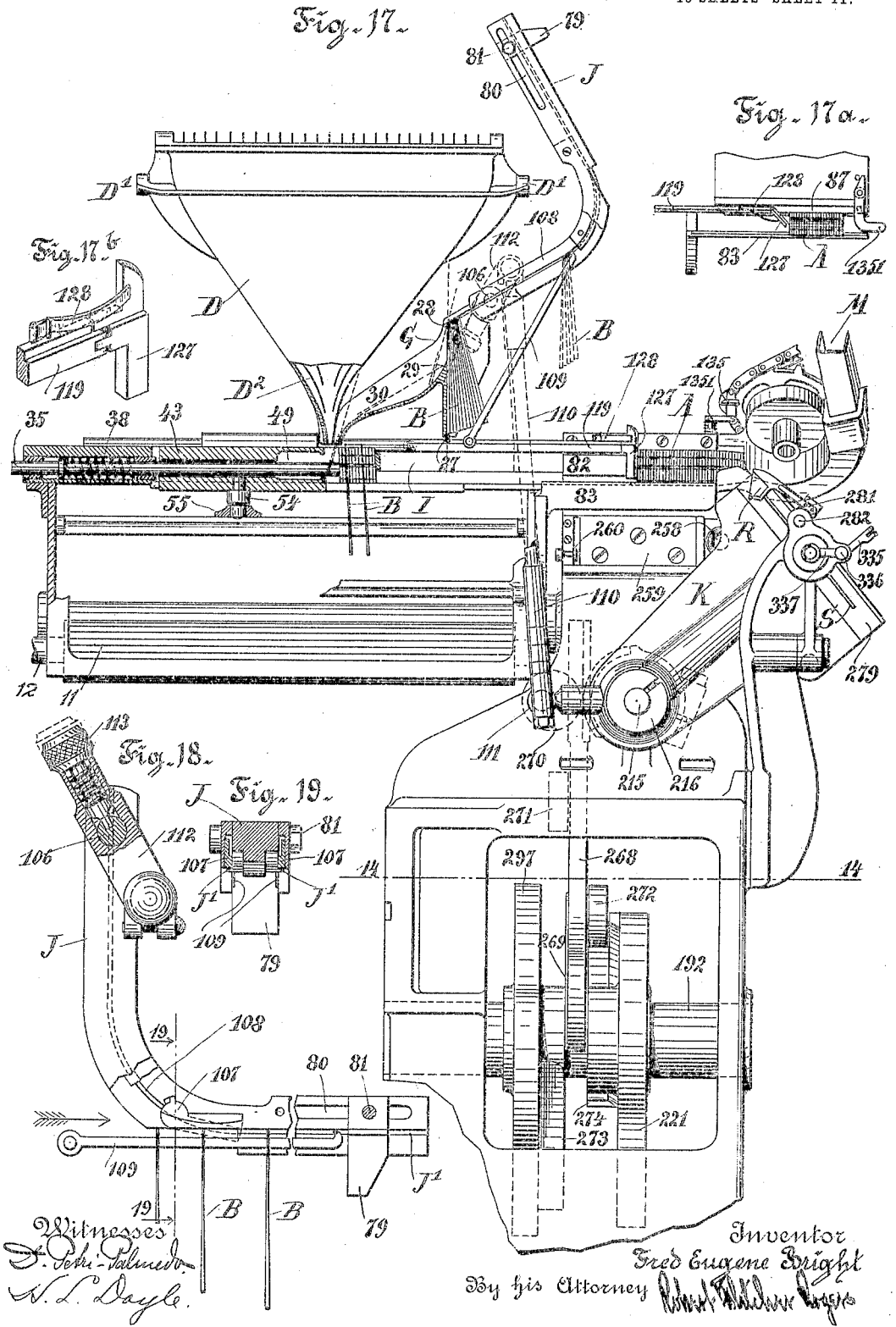

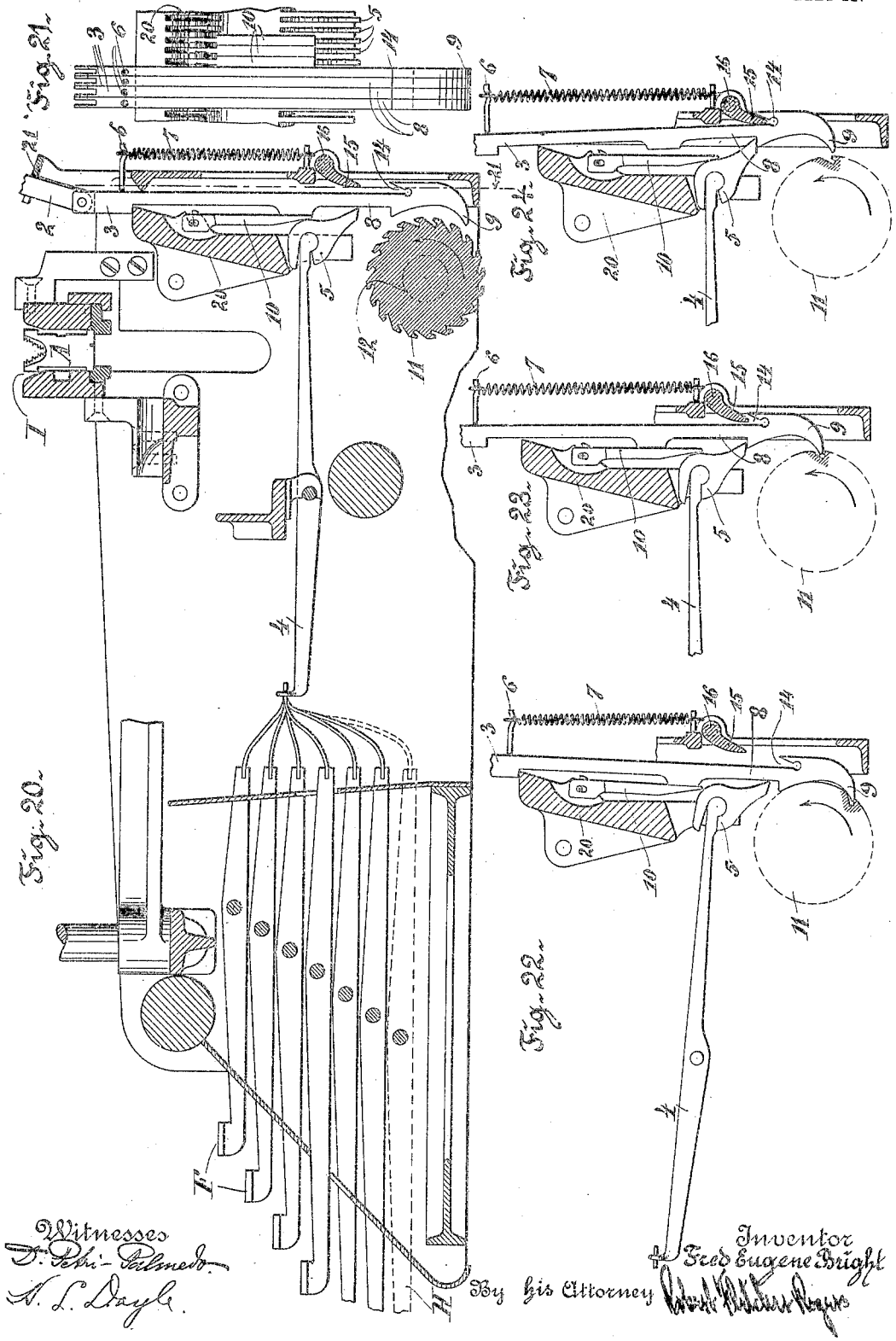

No. 793,766. PATENTED JULY 4, 1905.
F. E. BRIGHT.
LINOTYPE MACHINE.
APPLICATION FILED APR. 6, 1905.
15 SHEETS—SHEET 13.
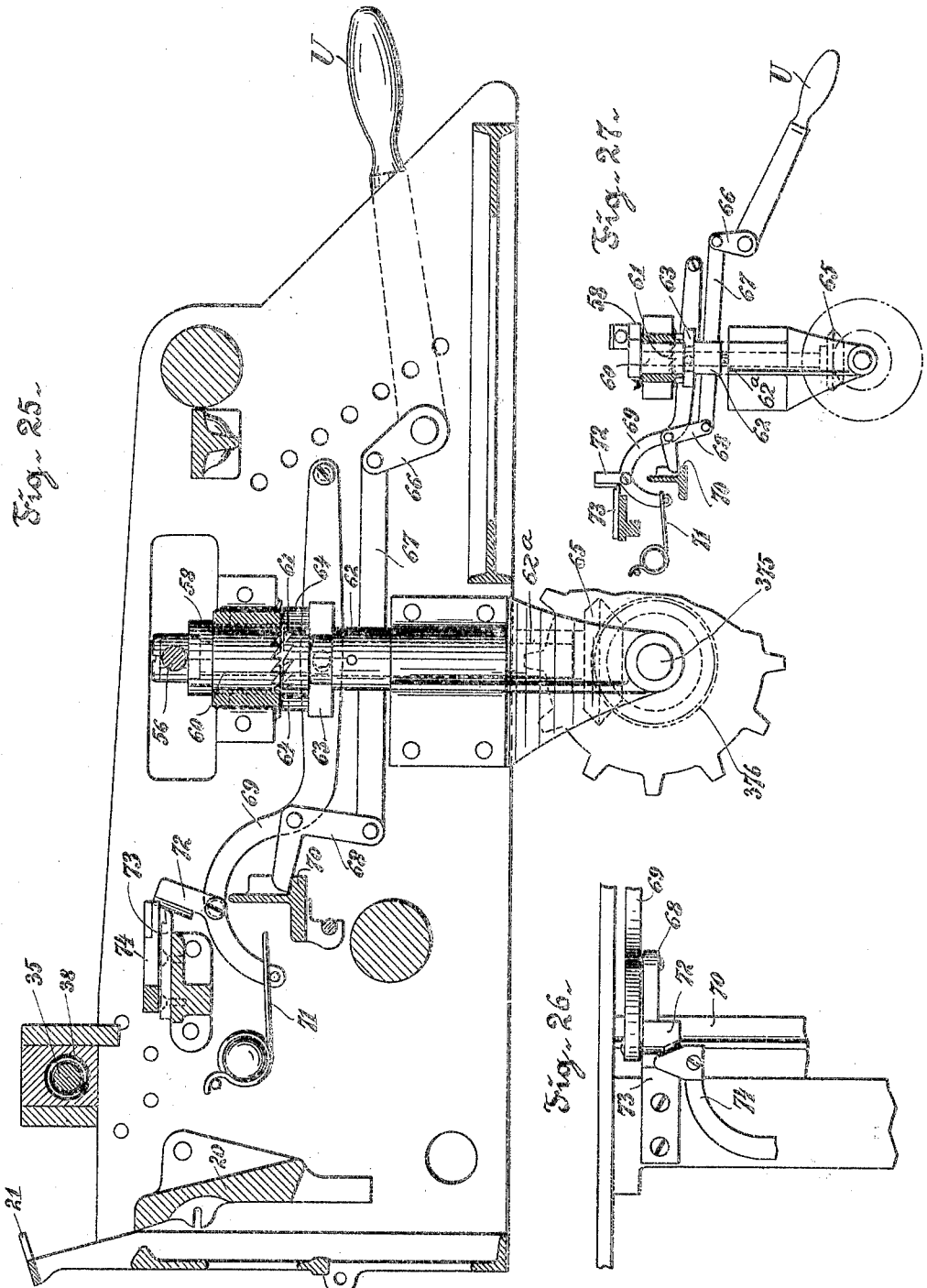

No. 793,766. PATENTED JULY 4, 1905.
F. E. BRIGHT.
LINOTYPE MACHINE.
APPLICATION FILED APR. 6, 1905.
15 SHEETS—SHEET 14.
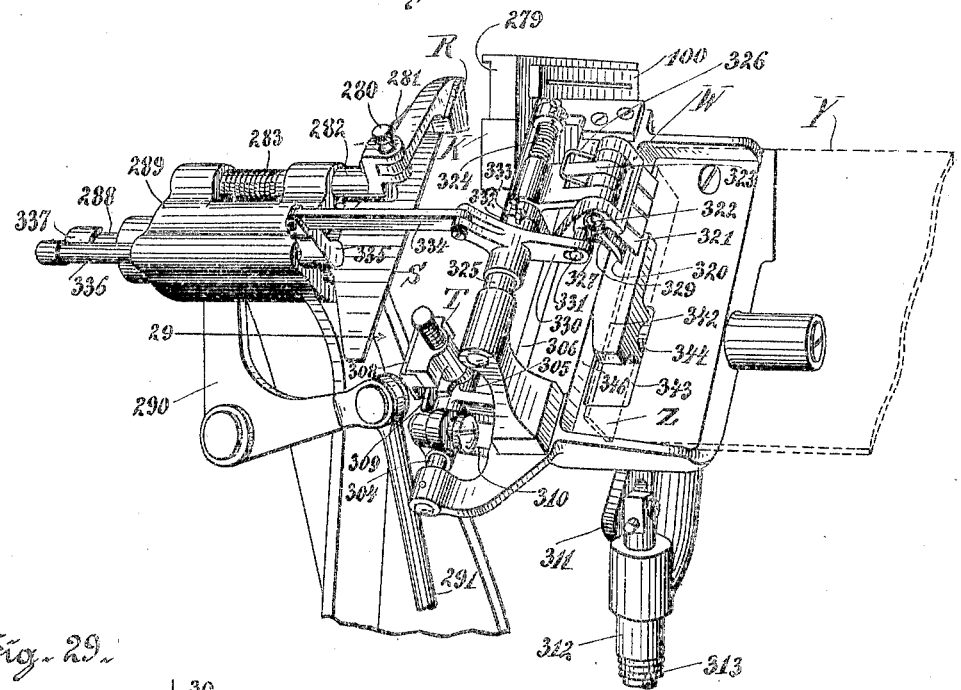
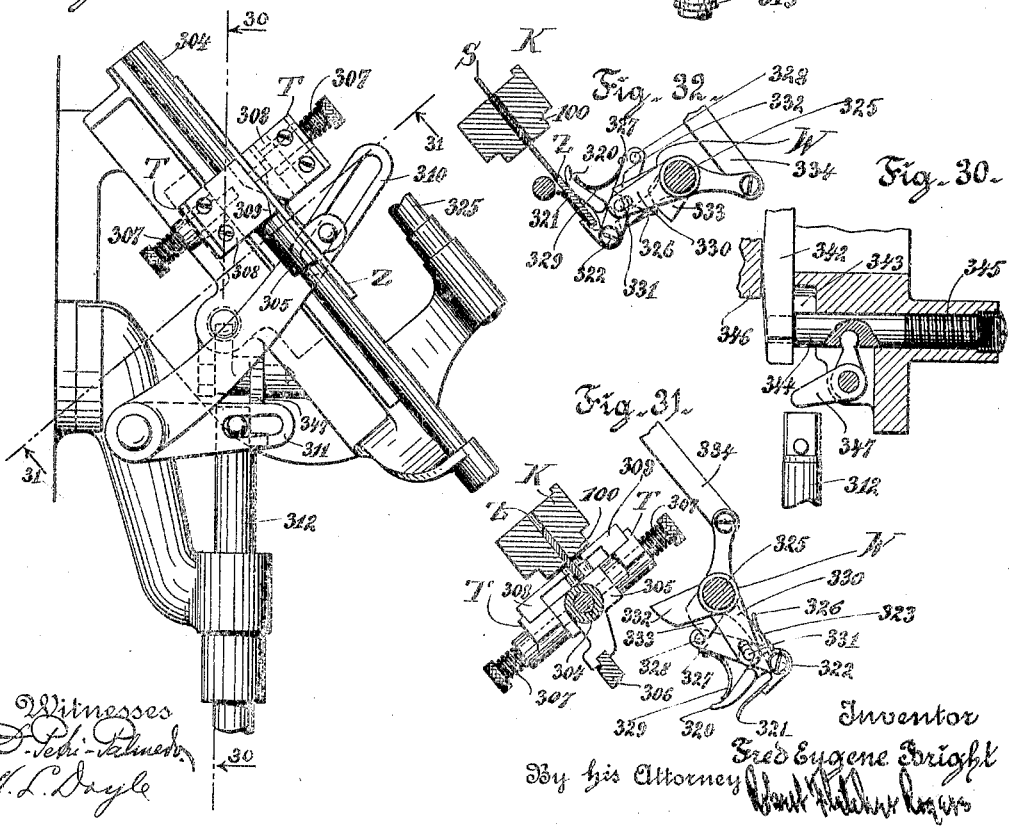

No. 793,766. PATENTED JULY 4, 1905.
F. E. BRIGHT.
LINOTYPE MACHINE.
APPLICATION FILED APR. 6, 1905.
15 SHEETS—SHEET 15.
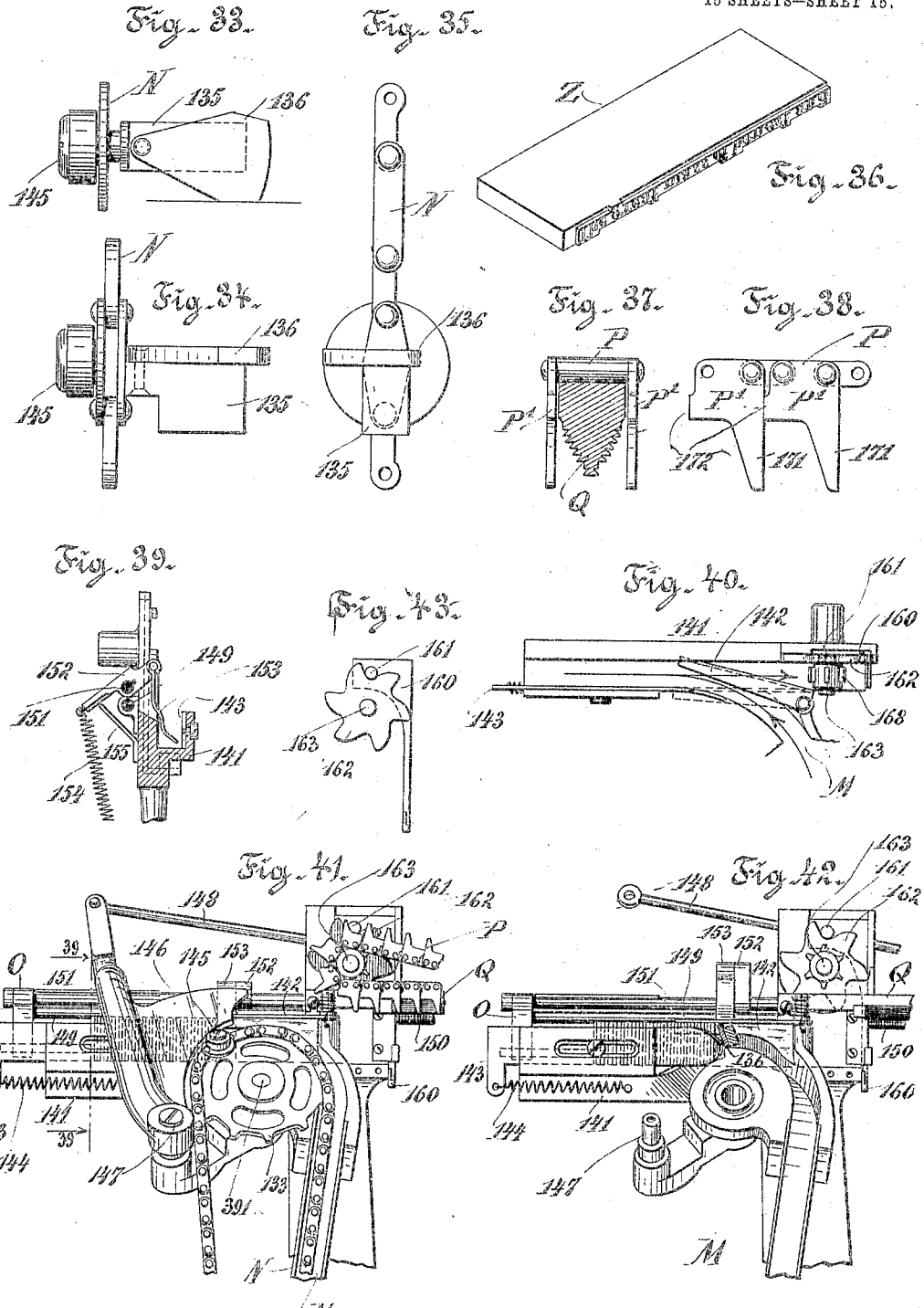
Witnesses
Inventor
Fred Eugene Bright
By his Attorney 

No. 793,766.                                                      Patented July 4, 1905.

UNITED STATES PATENT OFFICE.

FRED EUGENE BRIGHT, OF PHILADELPHIA, PENNSYLVANIA, ASSIGNOR TO MERGENTHALER LINOTYPE COMPANY, A CORPORATION OF NEW YORK.

LINOTYPE-MACHINE.

SPECIFICATION forming part of Letters Patent No. 793,766, dated July 4, 1905.

Application filed April 6, 1905. Serial No. 254,093.

*To all whom it may concern:*

Be it known that I, FRED EUGENE BRIGHT, a citizen of the United States, and a resident of the city of Philadelphia, in the county of Philadelphia and State of Pennsylvania, have invented certain new and useful Improvements in Linotype-Machines, of which the following is a specification.

My invention relates to linotype-machines designed to produce printing-forms composed of linotypes—namely, line bars or slugs—each bearing on its face properly justified all of the characters which appear in a line; and it consists in the novel construction, arrangement, and combination of parts, as illustrated in the drawings, described in the specification, and finally pointed out in the claims.

Referring to the drawings, wherein the same parts are represented by the same letters and figures of reference throughout the several views, Figure 1 is a front elevation of the machine. Fig. 2 is a right-side elevation. Fig. 2ª is a similar view, being a continuation of Fig. 2. Fig. 3 is a left-side elevation, partly broken away to expose interior parts. Fig. 3ª is a similar view, being a continuation of Fig. 3. Fig. 4 is a rear elevation. Fig. 5 is an enlarged plan view, partly in section, on the line 5 5 of Figs. 1 and 11. Fig. 6 is a side elevation of some of the parts shown in Fig. 5. Fig. 6ª is a detail view of the yielding resistant. Fig. 7 is a plan view, partly in section, on the line 7 7 of Fig. 1. Fig. 8 is a vertical section taken substantially on the line 8 8 of Figs. 1 and 14. Fig. 9 is a partial vertical section taken substantially on the line 9 9 of Figs. 1, 10, and 14. Fig. 10 is a partial vertical section taken substantially on the line 10 10 of Fig. 9. Fig. 10ª is a perspective view of the matrix. Fig. 10ᵇ is a perspective view of the spacer. Fig. 11 is a vertical section taken substantially on the line 11 11 of Figs. 1 and 14. Figs. 12 and 13 are similar views showing certain of the parts in different positions. Fig. 14 is a horizontal section taken substantially on the line 14 14 of Figs. 1, 2, 3, 4, 8, 9, 11, 15, and 17. Fig. 15 is a partial vertical section taken substantially on the line 15 15 of Figs. 1 and 14. Fig. 16 is a similar view showing certain of the parts in different positions. Fig. 16ª is a transverse vertical section of the mold and pot-mouth. Fig. 17 is a rear view of a portion of the machine, partly in section and certain of the parts removed. Fig. 17ª is a detail plan view of the matrix transfer-slide. Fig. 17ᵇ is a further detail of the same. Fig. 18 is a detached view, partly in section, of the spacer-restoring device. Fig. 19 is a sectional view of the same, taken on the line 19 19 of Fig. 18. Fig. 20 is a vertical section of the keyboard, taken on the line 20 20 of Figs. 1 and 7. Fig. 21 is a sectional detail taken on the line 21 21 of Fig. 20. Figs. 22, 23, and 24 are views similar to Fig. 20, showing certain of the parts thereof in different positions. Fig. 25 is a vertical section of the keyboard, taken on the line 25 25 of Figs. 1 and 7. Fig. 26 is a plan detail of certain of the parts shown in Fig. 25. Fig. 27 is a diagrammatic view similar to Fig. 25 and showing the parts thereof in different positions. Fig. 28 is a perspective view of the trimming, ejecting, and slug-delivering means. Fig. 29 is an elevation of certain of these parts looking in the direction of the arrow 29 of Fig. 28. Fig. 30 is a sectional detail on the line 30 30 of Fig 29. Fig. 31 is a sectional detail on the line 31 31 of Fig. 29. Fig. 32 is a similar view showing the parts in different positions. Figs. 33, 34, and 35 are details of the matrix-elevating chain. Fig. 36 is a view of a slug or linotype. Figs. 37 and 38 are details of the distributer-bar and chain. Fig. 39 is a transverse section of the distributer-box, taken on the line 39 39 of Fig. 41. Fig. 40 is a diagrammatic plan view of the distributer-box, indicating the direction of travel of the matrices. Fig. 41 is a detached view of the distributer-box and connected parts. Fig. 42 is a similar view, certain of the parts being removed. Fig. 43 is a detail of the matrix-lifting slide and the cam therefor.

*General operation.*—The general operation of the machine is substantially as follows: The matrices A are released from the magazine C through the operation of the escapements E, which are suitably connected to the finger-keys F. Similarly the spacers B are released from the spacer-magazine G by an escapement connected to the spacer-key H. The matrices A pass through the delivery-chute D to the channel I, where they are assembled with the spacers B in proper order to form the words of a line. The starting-lever U is then manipulated and the matrices and spacers are transferred to the casting position within the spacer device J, where they are alined, justified, and locked in position. The mold-frame K and pot L advance and the slug Z is cast. The matrices are then unlocked, and the device J removes the spacers from the line and they are restored to the magazine G. The matrices are transferred to the elevating-channel M, where they are engaged by the chain N and carried to the top of the machine. The shifter O moves them into position to engage the distributer-bar Q, along which they are carried by the chain P and restored to their proper channels in the magazine C. During these latter operations the mold-frame K turns outwardly and the base of the slug is trimmed by the knife R. The ejector-blade S then moves the slug Z so that it projects slightly from the mold-slot, in which position it is trimmed on its upper and lower front edges by the knives T T. The blade S then ejects the slug Z, which is received by the slug-assembling device W and delivered in proper position in the galley Y.

*Magazine, matrix, spacer, &c.*—The magazine C, the escapements E, the matrix A, and the spacer B, as shown in the drawings, are of the general type employed in the commercial Mergenthaler linotype-machine. The matrix A (see Fig. 10$^a$) is formed with the usual notch A' to engage the distributer-bar Q, and the spacer B (see Fig. 10$^b$) is provided with the customary ears B' B' and has an attached wedge-piece B$^2$, so that the thickness of the spacer may be varied at will in order to justify the line. The particular forms of these several devices constitute no part of my invention, and any suitable or desirable type may be substituted therefor.

The slug Z which is the product of the machine is of the well-known form illustrated in Fig. 36, being provided with a properly-justified line of intaglio characters along one edge thereof.

*Delivery-chute.*—The delivery-chute D (see Figs. 1, 2, 3, and 17) is formed with a number of channels D$^2$ which converge to a central point at the bottom thereof in place of the laterally-sloping channels sometimes employed. The matrix is thus enabled to descend from the magazine to the assembling-point in the shortest possible time, and the necessity for accessory devices, such as conveying-belts, &c., is thereby obviated. Moreover, as the matrices descend almost vertically the wear on their sides is reduced to a minimum. I preferably pivot the delivery-chute D at D' D' near its upper corners, so that it may be turned upward and out of the way to give access to the assembling-channel beneath it.

*Keyboard mechanism.*—The escapements E are connected to the bails 2, which are supported at their lower ends in the rack or comb 21 (see Figs. 1, 2, 3, 4, and 20) and are selected and reciprocated to actuate the escapements E and then to restore them to their original positions. The connections from the keys F to the bails 2 are illustrated in Figs. 20, 21, 22, 23, and 24. Each of the bails has pivotally connected to it a depending piece or latch 3, which in its normal or inoperative position rests upon the transverse bar 20 of the keyboard-frame. The latch 3 is provided with a pin 6, to which a spring 7 is connected in such manner as to hold the latch 3 normally in contact with the bar 20 and when not otherwise resisted to swing the lower end 9 of the latch 3 inward and into engagement with the constantly-rotating cylinder 11 on shaft 12. The cylinder 11 is formed with a series of longitudinal ridges or fins adapted to engage and raise the latch 3 when its lower end or hook 9 is swung into engagement therewith. The key F is a pivoted lever, connected at its inner end to an intermediate pivoted lever 4, the farther end of which is provided with a knuckle 5, connected thereto in such manner that it is capable of a certain amount of pivotal motion thereon. A depending interponent or piece 10 is pivotally connected to the bar 20, with its lower end located between the knuckle 5 and a shoulder on the piece or latch 3. These interponents 10 serve the double function of wear-plates and as filling-in pieces to hold the latches 3 normally away from the operating-cylinder 11. (See Fig. 20.) When the key F is depressed by the operator, the farther end of the lever 4 is thereby lowered, thus introducing the knuckle 5 into the recess 8 of the latch 3 and permitting the spring 7 to swing the hook 9 into engagement with the cylinder 11. (See Fig. 22.) The cylinder 11, because of its rotation and through its engagement with the hook 9, elevates the latch 3 and bail 2 in such manner as to operate the escapement E in one direction and release the matrix. At the same time the engagement of the recess 8 with the knuckle 5 raises the latter into contact with the plate 10 (see Fig. 23) and restores the operated key F to its original position. At this point the continued rotation of the cylinder 11 operates to free it from its engagement with the hook 9. In order, however, to insure its separation by a positive action, I have provided a reciprocating plate 15, which engages the notch 14 when the latch 3 is elevated, and thus positively withdraws the hook 9 from the cylinder 11. (See Fig. 24.) The spring 7 then acts to restore the latch 3 to its lowermost or normal position, (see Fig. 20,) thereby effecting the return movement of the bail 2 and completing the operation of the escapement E. The plate 15 is mounted upon a transverse rock-shaft 16, (see Figs. 2 and 4,) and upon one end of the rock-shaft 16 an elbow-lever 17 is rigidly secured, one member of which rests upon the cam 19 (see also Fig. 7) on the rotating shaft 12, the other end of the elbow-lever 17 being connected to the spring 18. Through the medium of the spring 18 and cam 19 a constant reciprocating action is imparted to the plate 15 for the purpose already described.

It will be seen that my keyboard mechanism is simple and direct in action and that the consequent operation of the escapement is thereby rendered positive, as well as the disengagement of the latch from the cylinder. The form of the actuating-cylinder, which is provided with a series of longitudinal plates or fins, practically insures the actuation of but one latch at a time, and thus prevents the simultaneous operation of a plurality of escapements and reduces the liability of transposition to a minimum. Moreover, in this mechanism I have largely reduced the number of necessary springs, and the parts are simple and cheap in construction, being preferably formed of stamped metal and easily fitted and quickly assembled.

*Spacer-magazine.*—The spacers B are stored in the magazine G (see Figs. 1, 4, and 17) and are released therefrom by the operation of the key H, (see particularly Fig. 20,) which is a member of the regular keyboard mechanism and connected, through a link 25 (see Fig. 4) and the pivoted lever 26, to the escapement device 27. (See also Fig. 17.) The spacers B are held by the engagement of their ears B' B' in the inclined groove 28 28 of the spacer-magazine G, with their lower portions resting against the wall or abutment 29. (See Fig. 17.) When the key H is manipulated, the escapement 27 is operated to act upon the lower portion of the spacer B, and as the ears B' B' are prevented from rising by their engagement with the grooves 28 28 the first effect is to move the wedge portion B² of the spacer upwardly until it clears the abutment 29, when gravity and the pressure of the remaining spacers cause it to fall into the delivery-channel 30 of the magazine G, and thus to be delivered into the assembling-channel I in immediate proximity to the matrices therein. The various positions occupied by the spacer B in its passage through the channel 30 are indicated by dotted lines in Fig. 17.

The particular form of spacer-escapement is not essential to my present invention, and other old and well-known types could be readily substituted therefor.

*Line-assembling means.*—In order to prevent the matrices and spacers from falling on those already delivered, it is necessary to provide means whereby the line as assembled is moved forward one step at a time, so as to clear the delivery-point. This is effected in the Mergenthaler machine by a star-wheel; but my present invention contemplates for this purpose the use of a reciprocating rod or pusher 35, which projects through the transfer-slide 43. (See Figs. 1, 2, 4, 5, 6, 7, and 17.) The necessary reciprocating motion is transmitted to the rod 35 by the pivoted lever 36 and crown-cam 37 upon the shaft 12, a coil-spring 38 (see Figs. 17 and 25) being connected to the rod 35 to secure its motion in one direction and the constant engagement of the lever 36 with the cam 37.

*Yielding resistant.*—In order to hold the line in position as it is advanced step by step by the reciprocating rod 35, I have provided a form of yielding resistant, (see Figs. 5, 6, and 6ᵃ,) which is connected to the transfer-slide 43, subsequently to be described. The piece 44 is slidably mounted upon the transfer-slide 43 in such manner that it may be moved thereon against friction. At the outer end of the piece 44 is pivoted a latch 45, which is normally held in position across the assembling-channel I by a spring 46. The line of matrices and spacers is assembled in the rear of the latch 45, and as the line increases in length the action of the reciprocating rod 35 thereon causes the piece 44 to move outwardly relative to the transfer-slide 43 in the manner well understood in the art. When subsequently the transfer-slide 43 acts to transfer the assembled line to the casting position, it is necessary to withdraw the latch 45 against the pressure of the spring 46 from before the line. This is effected by a pin 47, which during the motion of the slide 43 contacts with the projecting end of the latch 45, removing it from the channel. The continued movement of the slide 43 now restores the piece 44 to its innermost position on the slide 43, as the latch 45 and piece 44 are held against further movement by the pin 47. This retraction of the yielding resistant with reference to the slide 43 continues until the latch has entered and is contained within the recess 49 of the transfer-slide 43, thus permitting the complete transferral of the assembled line to the casting position. As the slide 43 now returns the latch 45 strikes a pin 48, thus withdrawing it from the recess 49 and leaving it in proper position in front of the next line to be assembled.

*Line-transfer mechanism.*—After the line is assembled it is transferred to the casting-point by the slide 43, located within and guided by the assembling-channel I. (See Figs. 1, 5, 6, 7, and 17.) The slide 43 is provided with a projecting pin 54, engaged by a slot in the pivoted lever 55, (shown in Fig. 17 and in dotted lines in Fig. 7,) which is connected by link 56 to the crank-arm 58. The actuation of the crank-arm 58 through the connections described moves the slide 43 positively to transfer the line to the casting position and then to return it, so that a new line may be assembled in front thereof. A spring or other yielding device 57 is interposed in the link 56 in order to obviate the danger of a jam or breakage of parts under abnormal conditions and to insure smoothness of action.

Motion is imparted to the crank-arm 58 when the starting-lever U is manipulated through devices now to be described, and more particularly illustrated in Figs. 25, 26, and 27. A sleeve or clutch member 60 is rigidly connected to the crank-arm 58 and is suitably mounted in the frame, so as to be capable of rotational motion therein. Beneath the clutch member 60 a corresponding clutch member 61, having sleeve 62 and splined on the vertical shaft 62ª, is located in position to actuate the clutch member 60 and crank-arm 58 when raised into engagement therewith. A collar 63 embraces the member 61 and is provided with pins 64 64, which enter correspondingly-shaped apertures in the frame to guide the longitudinally-movable member 61. The shaft 62ª at its lower end is provided with a bevel-pinion 65, which is constantly rotated in the manner subsequently to be described. The inner end of the starting-lever U has an arm 66, connected by link 67 to an elbow-lever 68, bearing at its farther end on the fixed abutment 70. The elbow-lever 68 is pivotally connected to the lever 69, which engages the collar 63 and raises the clutch member 61 into engagement with the clutch member 60 when the starting-lever U is operated. A transverse lever 72 is pivotally mounted upon the outer end of the lever 69, and a spring 71 bears upon one end of the lever 72, the other end of which is thereby forced into engagement with the fixed abutment 73 when the lever 69 is elevated.

The operation of the parts is as follows: When the lever U is depressed through arm 66, link 67, and elbow-lever 68, the lever 69 is lifted, thus engaging the clutch members 60 and 61 and actuating the crank-arm 58. The engagement of the upper end of lever 72 with the abutment 73 at this time insures the engagement of the clutch members 60 and 61 until released therefrom in the manner indicated hereinafter. This position of the parts is shown in Fig. 27. Through the connections already described the complete rotation of the crank-arm 58 moves the slide 43 to the casting-point and then restores it to the assembling position, after which the crank-arm 58 comes to rest. The disengagement of the clutch members 60 and 61 for this purpose is effected by an arm 74, (see also Figs. 1 and 7,) connected to the slide 43. Near the end of the return movement of the latter the nose of the arm 74 (see Figs. 25 and 26) contacts with the upper end of the lever 72 and forces it out of engagement with the abutment 73, whereupon the spring 71, acting thereon, restores the parts to their inoperative positions and disengages the clutch members 60 and 61. I have thus provided a positive and certain means for moving the assembled line to the casting-point and restoring the transfer-slide to its original position.

*Line-locking mechanism.*—When the assembled line has been transferred to the casting-point, it enters and is contained partly within the spacer device J. (See Figs. 8, 10, 17, and 18.) The ears B' B' of the spacers B enter the grooves J' J' of the device J and are sustained thereby. The matrices A while contained within the device J are nevertheless free therefrom, being supported by the engagement of the ledge 82 with one side of the matrix and of the bar 83 with the lower opposite corner thereof. (See Figs. 8, 9, and 17.) In this position one side of the device J also rests upon the ledge 82 and is sustained thereby. A projecting lug 79 of the device J (see Figs. 17, 18, and 19) constitutes the front jaw or abutment for the line. The jaw 79 is adjustably mounted upon device J by means of the slot 80 therein and the adjusting-screw 81, whereby its position may be varied at will and the length of line correspondingly altered.

The rear jaw 84 (see Figs. 5, 7, and 11) is pivotally mounted upon the vertical shaft 85. Its normal position is that shown by full lines in Fig. 5, from which it turns to its operative or locking position, as indicated by dotted lines therein. The shaft 85 is provided at its upper end (see Fig. 7) with a pinion 86, meshing into the horizontally-movable rack 87. A depending arm 88, mounted in the bracket 89, (see Figs. 1, 2, 3, and 7,) is so located as to be engaged and moved about its pivot by the transfer-slide 43 during its operation. A pin 90 (see Fig. 2) upon the rack 87 is at this time engaged by the depending arm 88 and causes the actuation of pinion 86, shaft 85, and jaw 84, so as to lock the line between jaw 84 and the front jaw 79, the parts being so timed that the jaw 84 will close in upon the line after the latter has been moved to the casting-point by the slide 43. This movement of the jaw 84 and shaft 85 also effects the starting of the casting and other automatic operations connected therewith. Also mounted upon the shaft 85 (see particularly Figs. 5, 7, 11, and 12) is a projecting sector 91, which, in effect, is a rearward extension of the jaw-piece 84. The outer surface of the sector 91 normally bears against and resists the spring-pressed starting pin or bolt 93. When, however, the jaw 84 is operated and the parts assume the dotted-line position in Fig. 5, the sector 91 is turned far enough to free it from engagement with the pin 93 (see Fig. 11) and to permit the starting of the casting and other mechanisms in the manner subsequently to be described. In this position the spring-pressed bolt 93 engages the end 92 of the sector 91, and thus locks the jaw 84 in operative position during the casting operation until the bolt 93 is retracted, as hereinafter explained. In the event of the line being overset—that is to say, if the combined length of the matrices and spacebands in the line is greater than the prescribed measure—it will offer resistance to the transfer-slide 43, and thus prevent the jaw 84 from assuming its regular position, thereby maintaining the sector 91 in continued engagement with the starting-bolt 93 and preventing its inward movement. The extremity 92 of the sector 91 is ground ordinarily in such manner that the difference of a few thousandths of an inch in the length of the line will hold the starting-bolt 93 in its outward or inoperative positions.

It will be seen that the locking mechanism provided is simple and efficient in operation and with the connections described affords a certain and positive means of preventing the action of the casting and other operations in the event of a line being improperly confined.

*General subsequent operations.*—After the line has been locked in the manner previously described the matrices are alined by the hook 98, the line is justified and expanded by the action of the justifying-bar 99 upon the wedge members B² of the spacers B, the mold-frame K advances and moves the mold 100 into engagement with the matrices, the pot L advances and engages the pot-mouth 101 with the mold, and the pump injects the metal to form the linotype or slug within the mold. These operations will be specifically described at a later point in the specification.

*Unlocking and restoring mechanism.*— After the slug has been cast the mold-frame K withdraws the mold 100 from engagement with the matrices. The line is then unlocked and the spacers restored to their magazine G. The withdrawal of the rear jaw 84 is effected in the manner hereinafter to be described. The spacer device J (see Figs. 17, 18, and 19) is L-shaped, with the apex rounded off, and is movably supported in the frame of the machine by its pivot-shaft 106. (See Fig. 3.) When in its lowermost or casting position, its under edge rests upon the ledge 82, as previously described. It is provided near its apex with a pair of switches 107 107, which ordinarily assume the position indicated by dotted lines in Fig. 18. When in this position, the line is transferred thereto and the space-bands enter in the direction of the arrow and pass under the switches 107 107, raising them and permitting them to drop after they have been completely introduced. The ears B' B' of the spacers B now engage and are supported by the grooves J' J'. The interior of the device J is hollow to permit the wedge portions B² of the spacers B to rise therethrough during the operation of justification. The upper portion of the device J is formed internally with a pair of grooves 108 108, which extend throughout its length and connect over the upper surfaces of the switches 107 107 with the grooves J' J' in the lower portion, and this connection is established while the switches 107 107 are in their lowermost or dotted-line position. The upper end of the device J is arranged in proximity to the spacer-magazine G in such manner that when the device J assumes its upper position (see Fig. 17) the grooves 28 28 of the magazine G connect with and constitute continuations of the grooves 108 108 of the device J. An arm 112 is detachably secured to the pivot-shaft 106 and is connected by a link 110 to an arm 111 on the mold-frame K. (See Figs. 4 and 17.) When the latter is swung about its pivot in the manner subsequently to be described, through the arm 111, link 110, and arm 112, the device J is raised to the position shown in Fig. 17, and due to the engagement of the ears B' B' of the spacers B with the grooves J' J' the spacers are lifted out from among the matrices, and as the device J assumes its upper position they slide by gravity along the grooves J' J', over the switches 107 107, and along the grooves 108 108 into the grooves 28 28 of the magazine G. While this transferal of the spacers may be effected entirely by gravity, I provide an additional device to prevent the possibility of their sticking or catching in the grooves. This consists of a pair of hooks 109 109, one at each side of the device J and pivoted to the frame of the machine. These hooks 109 are so fashioned and located that when the device J is at the casting-point they assume the position indicated in Fig. 18, with the ends thereof close to the jaw or abutment 79 and beyond the ears of the farthest spacer B. When the device J is turned upwardly to the position shown in Fig. 17, the hooks 109 109 travel along the grooves J' J', behind the spacers B, and prevent the possibility of their catching or remaining therein until they pass the switches 107 107 and are free and clear within the grooves 108 108, whence they pass to the grooves 28 28 of the magazine G. After the spacers are restored to their magazine the mold-frame K swings back and restores the device J to the lowermost or casting position. The arm 112 is provided with a spring-pressed pin 113, which engages in one position with a recess in the pivot-shaft 106 and is thereby rigidly connected to the device J. When the spring-pressed pin 113 is withdrawn from engagement with the pivot-shaft 106, the arm 112 swings freely thereon, and in this event the turning of the device J by the link 110 and arm 111 on the mold-frame K is prevented. This detachable connection thus permits the casting of a plurality of slugs from the same assembled line, which will remain in proper position therefor so long as the connection between the device J and the operating-link 110 is broken. It will also be seen that the upward movement of the device J removes the attached front jaw 79 from before the matrices, as well as the spacers contained within the line, and that the matrices are thus left free to be moved still farther to the elevating and distributing devices. It is to be noted at this point that the matrices are assembled, moved to the casting position, and from this to the elevating devices in the same horizontal plane and practically in a path that is a continuation of the assembling-channel I. (See Fig. 17.) This desirable result arises from the construction and arrangement of the simple devices I have described.

*Matrix-transfer mechanism.*—The matrices A are now moved to the elevating-channel M. (See Figs. 1, 2, 7, 17, 17ª, and 17ᵇ.) This is effected by the slide or plate 119, connected to the sleeve 120, which moves upon and is guided by the rod 121. The lever 122 is pivotally connected to the sleeve 120 and is under tension by the spring 125, which tends to move it toward the elevating-channel M. A roller on link 123, connected to lever 122, is controlled by the cam 124 on the shaft 126, subsequently to be described. After the slug has been cast and the spacers removed from the line the cam 124 moves out of engagement with the link 123 and permits the spring 125, through the connections described, to move the transfer-plate 119 toward the elevating-channel M, where it remains until during the further rotation of shaft 126 the cam 124 again engages the link 123 and restores the parts to their normal and inoperative position.

The transfer-plate 119 is provided with a depending contact-piece 127, (see Figs. 17, 17ª, and 17ᵇ,) which is pivotally connected to the plate 119, so that it may swing laterally across the channel. The plate 119 is arranged at one side of the channel and above the ledge 82, over which it passes when advanced, and at this time the depending contact-piece 127 strikes the edge of the ledge 82 and is thereby forced across the channel and in position to engage the matrices contained therein, and the further advance of the plate 119 causes the removal of the matrices to the elevating-channel M. The contact-piece 127 is provided with a spring 128 to restore it to its inoperative position when the plate 119 is withdrawn, or, if desired, the spring may be omitted, as the advance of the subsequent assembled line is sufficient to move the piece 127 out of the channel.

*Elevating means.*—The end of elevating-channel M is located in proximity to the casting-point and constitutes, in effect, an extension of the assembling-channel I. The channel M is S-shaped and is traversed throughout its length by a projection on chain N. (See Figs. 1, 3, and 4.) At its lower end the chain N passes around a sprocket-wheel 132 and at the upper end around a sprocket-wheel 133. The upper sprocket-wheel 133 is frictionally mounted on a constantly-rotating shaft 391, subsequently to be described, thereby imparting motion to the chain N, which passes upwardly from the sprocket-wheel 132 along the channel M, around the sprocket-wheel 133 and downwardly beneath the channel M, and around the guide-roll 134 to the sprocket-wheel 132. The chain N (see Figs. 33, 34, and 35) has an inwardly-extending piece 135, which projects into the channel and is provided there with a pivoted movable section 136, the pivotal arrangement permitting the latter to conform itself at all times to the curvature of the channel. The piece 136 enters the channel M behind the matrices transferred thereto and carries them upward and into the receiving-box 141. The frictional engagement of the sprocket-wheel 133 with the shaft 391 is sufficiently strong to insure the constant actuation of the chain N unless the latter be positively held against movement. To secure the proper engagement of the projection 135 136 with the matrices to be elevated, I provide a spring-pressed stop-piece 1351, (see Figs. 1, 7, 17, and 17ª,) which normally stands in the path of the projection 135, so as to engage the same and check the actuation of the chain N. When, however, the matrices are delivered to the channel M by the transfer-plate 119, the latter moves the spring-pressed stop 1351 out of its normal position in engagement with the projection 135, thereby permitting the chain N to resume its movement and convey the matrices to the box 141. On the return of the plate 119 the stop 1351 resumes its former position in readiness to engage and check the chain N when the projection 135 again contacts therewith.

*Distributing-box, &c.*—The distributing or receiving box 141 is located at the top of the elevating-channel M and in contiguity to the distributing devices. (See Figs. 1, 3ª, 4, 39, 40, 41, 42, and 43.) The box 141 is provided with a spring-pressed switch 142, (see Figs. 40, 41, and 42,) arranged to be moved laterally by the matrices as they are delivered and then to be restored to its normal position and close the side of the box, through which the matrices are then shifted to the distributing devices. The path of the matrices is diagrammatically represented by the arrows in Fig. 40, the lower arrow indicating the arrival of the matrices at the box and the displacement of the switch 142 being shown in full lines, after which the switch is restored by its spring to the dotted-line position, and the matrices are then transferred past the switch in the direction of the upper arrow to the distributing devices. The arrangement as described insures their final delivery in proper position to be distributed, as notwithstanding the tortuous path they have pursued they are presented in the receiving-box in the same relation that they occupied during the casting. If the matrices were received in the opposite direction at the end of the elevating-channel M, they would be reversed, and consequently could not be delivered properly to the magazine.

In order to allow the escape of the pieces 135 and 136 of the chain N from the box 141, I have provided the latter with a sliding piece or switch 143, which is normally held in position to close the side of the box 141 by the spring 144. (See Fig. 42.) After the matrices have been delivered within the box 141 the piece 136, because of the continued motion of the chain N, impinges against the end of the slide 143 and moves it longitudinally (see Fig. 41) to a sufficient extent to permit the exit of the pieces 135 and 136, after which it resumes its normal position and closes the side of the box 141, while the matrices therein contained are transferred to the distributing devices.

The longitudinal shifting of the matrices from the box 141 is effected by the transfer-piece O. The chain N immediately above the pieces 135 and 136 is provided with a stud or knob 145. (See also Figs. 33 and 34.) As the line is delivered to the box 141 the stud 145 contacts with a cam-piece 146, pivoted at 147 to the frame and connected by the link 148 to the horizontal longitudinally-sliding rod 149, upon which the transfer-piece O is mounted. A spiral spring 150 surrounds the rod 149 and is interposed between the frame and the end of link 148. As the stud 145 contacts with the cam-piece 146 the rod 149 will be moved outwardly against the force of the spring 150, thereby compressing the latter and giving the transfer-piece O its extreme outermost position and advancing it in front of the matrices which are at the same time being delivered within the box 141. As the chain N continues its motion the stud 145 passes out of engagement with the cam-piece 146, and the spring 150 then restores the displaced parts to their original positions and the transfer-piece O moves the matrices ahead of it to the distributing devices.

As already indicated, the spring-actuated switches 142 and 143 normally close the several apertures in the box 141 as the matrices are transferred therefrom. However, in order to insure the accurate delivery of the matrices therein and to prevent their displacement for any reason I have provided additional means to engage the matrices at the other end when they are delivered to the box and also to clamp them against the slide O as the latter moves them to the distributing position, at which point or just before it it is withdrawn from the channel. The rod 151 is mounted immediately above and in parallelism to the rod 149 and is longitudinally movable in connection therewith, a projecting portion of the piece O contacting with the end thereof and moving it simultaneously with the rod 149 as the latter assumes its outermost position. (See Figs. 41 and 42.) A lever 152 (see Fig. 39) is pivotally mounted upon the rod 151, but is confined thereon, so as to move longitudinally therewith. The outer end of the lever 152 is acted upon by a spring 154, attached to the frame. (See Fig. 4.) The inner end of the lever 152 is loosely connected to the clamping piece or slide 153, which is adapted to project into the box 141 at the inner end of the line of matrices. When the parts occupy their normal positions, as shown in Figs. 4 and 42, the spring 154, acting upon the outer end of lever 152, raises the piece 153 out of the box 141. When, however, the movement of rod 149 and transfer-piece O causes the longitudinal movement of rod 151, the lever 152 passes into engagement with the fixed plate 155 at the back of box 141, (see Fig. 39,) thus raising the outer end of lever 152 and lowering the clamping-piece 153 into the box 141, so that the matrices delivered therein are contained between the sliding piece O and the piece 153. When the rod 149 and transfer-piece O move in the reverse direction, in the manner previously described, the matrices are advanced therewith between the slide O and piece 153 until the lever 152 passes beyond and out of engagement with the fixed plate 155, (see Fig. 4,) when the spring 154 acts upon lever 152 and raises the piece 153 out of the box 141 and permits the transfer of the matrices to the distributing means.

*Matrix-separating means.*—After the matrices have been transferred in the manner just described they are lifted one by one to a position where they are engaged by the chain P and moved along the distributing-bar Q. This is accomplished by a reciprocating lifter or separator 160, (see Figs. 41, 42, and 43,) provided with a pin 161, which is constantly engaged and actuated by the cam or star wheel 162 on the shaft 163. The shaft 163 receives its motion through the sprocket-wheel 168 of the conveying-chain P, presently to be described. As the matrices are thus lifted one by one they are engaged and carried along the distributer-bar Q by the projecting links P' of the chain P. It will be seen that the immediate connection of the operating means for the lifter 160 to the conveying-chain P insures the absolute and necessary synchronism of the parts and that the matrix will always be elevated at the proper time to be engaged by one of the links P'.

*Distributing means.*—The distributing-chain P (see Figs. 1, 2ª, 3ª, and 4) is mounted upon sprocket-wheel 168 upon shaft 163 and sprocket-wheel 170 upon shaft 169. Motion is imparted to the shaft 169 in the manner subsequently to be described. The chain P is provided with two parallel series of projecting links P' P', that straddle the distributer-bar Q, (see Figs. 37 and 38,) along which they are moved to convey the matrices thereon to the points from which they are dropped into their appropriate channels of the magazine C. Each of the links P' is formed with a straight edge 171, perpendicular to the line of travel, which engages the side of the matrix suspended from the bar Q throughout a considerable portion of its length, and thus prevents vibration or swinging of the matrix during its journey. The link P' is provided at is other side with a short straight edge 172, parallel to the straight edge 171. The straight edge 172 is so located as to contact with the straight edge 171 of the next link P', and so on throughout the series, thus insuring the parallelism of all the straight edges 171 171 and their perpendicularity to the line of travel.

*Jaw-unlocking mechanism.*—Having now traced the course of the matrices and spacers from their magazines through their several functions to their final distribution and restoration to the respective magazines, it becomes necessary to consider the various automatic operations which are initiated by the delivery of the assembled line to the casting-point. The mechanism for moving the rear jaw 84 into operative position has been already described, and the means for restoring it after the casting of the line are shown in Figs. 1, 2, 3, and 7. The pinion 86 upon shaft 85 meshes into the pivoted toothed sector 177, which is provided at its other end with an abutment 178. This abutment 178 is so located as to be engaged and moved by the cams 179 and 180 upon the shaft 126. When the jaw 84 closes in upon the line, the sector 177 and abutment 188 are swung about their pivotal point. The cam-piece 179 on the shaft 126 is so located that it will strike the abutment 178 and partially return it to its normal position, and through the connected parts the jaw 84 is thereby removed sufficiently from the end of the line to relieve the strain thereon and permit the elevation of the spacer device J and the removal of the spacers B. As the shaft 126 continues its rotation, the cam 180 in turn engages the abutment 178 and completes the restoration of the jaw 84 and the connected devices to their original and inoperative positions. The abutment 178 is formed with a concave depression adapted to receive the convex cam 180 after the abutment has been moved to its normal position and to be centered thereby as the cam 180 completes its movement, as shown in Fig. 7.

*Alining mechanism.*—The means for alining the matrices at the casting-point are shown in Figs. 1, 8, 9, 10, 11, and 14. When the matrices A are in position with one corner resting upon the support 83 and the opposite face embracing the ledge 82, the lower lugs of this face are engaged by the alining plate or hook 98, which is located beneath the ledge 82 and is normally pressed into engagement with the matrices by the spring 185. The hook 98 is provided with pins 186, which enter recesses in the plate 259, and thereby limit its downward or operative movement. The plate 98 is connected at its lower corners by adjusting-screws 188 188 to a yoke 187, which straddles and is guided by the mold-sleeve 214. The yoke 187 is pivotally connected to a lever 189, so located that it is engaged and actuated by the cam 190 of cam-wheel 227 upon the cam-shaft 192. A flat spring 191 presses upwardly upon the lower end of yoke 187 in such manner as to restore the alining-plate 98 to its upward or inoperative position as soon as the arm 189 is freed from its engagement with the cam 190. The cam 190 (see Fig. 9) is formed near its front end with a slight depression 193, the effect of which is to permit a slight relaxation of the alining or gripping action of the hook 98 upon the matrices during the time that the justification is going on. As the cam-wheel 227 continues its rotation, the hook 98 is again drawn positively down and alines the matrices, which at this time rest with their upper corners at one side on the ledge 82 and at the other side on the mold 100. (See Fig. 8.)

*Justifying mechanism.*—Justification is effected by driving the wedges B² of the spacers B upward through the line, the result of which is to lengthen it out between the jaws 79 and 84 and at the same time to occupy all of the space between the words, so as to prevent the passage therethrough of the molten metal from the pot. The justifying mechanism is best shown in Figs. 3, 8, 9, 10, and 11. The justifying-bar 99 is mounted upon a vertically-movable rod 197, guided in the bracket 210. (See Fig. 3.) Between the bracket 210 and a projection on the rod 197 a spiral spring 198 is interposed, which normally tends to raise the rod 197 and the connected bar 99, so that the latter may engage the spacers B and force them through the line for the purpose of justification. This action of the spring 198 is resisted and controlled by the cam 199 on cam-shaft 192, which engages a roller 201 on the piece 200, connected to the vertical rod 197. The cam 199 is formed with a series of depressions 209, each succeeding depression being radially nearer to the center of the cam. As the cam 199 rotates through the parts described the justifying-bar 99 is given a series of upward and jogging strokes, and thus drives the spacers farther and farther through the line until their resistance is sufficient to overcome the power of the spring 198. The object of this jogging or intermittent action of the justifying-bar 99 is to permit the line to expand longitudinally with greater freedom than would be possible were the spacers driven home at one stroke. The number of depressions 209 in the cam 199 is greater than necessary to secure the justification of a normal line. In other words, if roller 201 engages with the last of the depressions 209 it is because the line presented at the casting-point is under set and indicates that the justification thereof will not be sufficient to close it and prevent the passage therethrough of the injected molten metal. It therefore becomes necessary to stop the pump action in order to avoid squirting. I have provided mechanism for this purpose, as best illustrated in Figs. 2, 3, 4, 14, 15, and 16. A vertically-movable projecting piece 202 is mounted upon the frame of the machine and connected to a spring 203, so that it is normally held in its lowermost position. The piece 202 projects into the path of the piece 200 upon the vertical rod 197, but is so located that during the normal action of the justifying mechanism it will not contact therewith. If, however, a short or under-set line or no line is presented at the casting-point, the rod 197 will rise in the manner already described to such an extent that it engages and raises the piece 202 against the pressure of the spring 203. In this position the outer end of the piece 202 as the pot swings forward engages an arm 204 upon the rock-shaft 205 and connected thereto by the spiral spring 206. The rock-shaft 205 is mounted in the pot-supports 223 223 and is provided at its opposite end with a depending arm 207, which has a projection 208 at its lower extremity. The arm 207 normally occupies the position shown in Fig. 15. When an under-set line is presented and the piece 200 thereof rises to an abnormal extent, the advance of the pot brings the arm 204 into contact with the piece 202, and the rock-shaft 205, arm 207, and projection 208 are moved to the position indicated in Fig. 16 and prevent the injection of the molten metal in the manner subsequently to be described. The spring 206 is interposed between the arm 204 and the shaft 205 to insure smoothness of action and prevent the jar of collision.

*Mold and pot advancing mechanism.*—The means for moving the mold and pot to the casting position and for retracting them therefrom are shown in Figs. 1, 3, 4, 7, 8, 11, and 14. The mold 100 and pot-mouth 101 rest normally, as shown in Figs. 3 and 7. At the time of casting, however, they occupy the positions shown in Figs. 8 and 11—that is to say, with the mold 100 introduced beneath one side of the spacer device J and within the shoulders of the matrices A and with the pot-mouth 101 in engagement with the rear side of the mold 100, so that the metal may be injected therein. The mold-frame K, which carries the mold 100, is capable of two motions—one rotational and the other toward and from the presented line. The latter only of these movements will be considered at this point. The mold-frame K is mounted upon a sleeve 214, which is connected by a rod 215 to a pivoted link 217 on the depending cam-arm 218. The nuts 216 216 on the rod 215 at the ends of the sleeve 214 afford a means for the accurate adjustment of the mold-frame K and mold 100 with reference to the casting position and the arm 218. The cam-arm 218 is pivoted at 219 and provided at its lower end with a roller 220, arranged in proximity to the cam 221 on cam-shaft 192. The cam 221 is formed with a projecting portion 232, which acts upon the roller 220 and through the parts described moves the mold 100 into the casting position at the proper time. The cam-surface 232 has a slight depression 222 to permit the partial easing of the pressure of the mold 100 on the assembled line during the justifying operation. The depression 222 in the cam-surface 232 is similar to and has substantially the same function as the depression 193 in the alining-cam 190, previously described. The pot L is mounted in a frame or supports 223 223, provided at the lower end with a transverse pivotal shaft 224. An operating-arm 225 is located upon the pivotal shaft 224, being connected thereto by an interposed spiral spring 228, which is intended to insure smoothness of action and hold the arm 225 in contact with its operating-cam. The arm 225 is provided at its upper end with a roller 226, which engages and is moved by the cam 227 on cam-shaft 192 in such manner as to withdraw the pot L after the casting operation. The frame 223 of the pot L is also connected by a link 230 to the depending cam-arm 218 previously described. A nut 231 upon the end of the link 230 insures the accurate adjustment thereof with relation to the pot-frame 223.

The operation of the parts is substantially as follows: As before stated, the parts normally occupy the position shown in Figs. 3 and 7, with the mold 100 in line with but retracted from the assembled line and with the pot-mouth 101 in line with but retracted from the rear of the mold 100. The cam-shaft 192 during its rotation brings the surface 232 of cam 221 into contact with roller 220 of cam-arm 218 and forces it outwardly, and thereby through link 215 and link 230 advances the mold 100 and pot-mouth 101 to their operative positions, as shown in Figs. 8 and 11. The pump mechanism is then operated in the manner subsequently to be described, after which the cam-surface 232 passes beyond and out of engagement with the roller 220 on cam-arm 218. At this point cam 227 acts upon the roller 226 on arm 225 and the pot L is moved rearwardly, and through link 230 the cam-arm 218 is also restored, and through link 215, connected to arm 218, the mold 100 is withdrawn, and the parts assume the positions indicated in Figs. 3 and 7. It is noted that the link 217 is connected to the cam-arm 218 at a point nearer to its fulcrum than the link 230. Due to the difference in leverage thus secured, the motion in both directions of the pot L is considerably greater than that of the mold-frame K, and thereby at the end of the operation the pot L is sufficiently removed from the mold-frame K to permit the latter to be shifted in the manner subsequently to to be described. It will be seen that this arrangement secures the positive operation of mold and pot in both directions.

The location of the pot at the rear of the machine and outside of and away from the other operative parts obviates an objection which exists in many forms of linotype-machines—namely, the transmission of heat from the molten metal and the heating means to adjacent devices and mechanisms. From actual experience with the present form of machine I have found that there is little or no heat conveyed to the other parts. The transmission of heat by conduction is practically impossible, as the only connection is through the considerable mass of metal contained in the supports 223 223 to the pivotal shaft 224, which is supported at the base of the machine-frame. Further, this external arrangement of the pot, pump, &c., makes them readily accessible to the operator for adjustment and manipulation.

*Mold-centering device.*—In order to effect the exact registration of the slot in the mold 100 with the characters on the matrices A, I have provided the mold-frame K with a pin 257, (see Figs. 7 and 15,) which enters the centering-recess 258, (see Figs. 10 and 17,) when the mold is advanced in the manner previously described. The recess 258 is formed with sloping sides in the plate 261, which latter is mounted upon the plate 259. The plate 259 is located within a recess in the frame of the machine and is capable of longitudinal movement therein, which is governed by the adjusting-screw 260. The plate 261 slides vertically within the plate 259, and the latter may be adjusted at will so as to center the mold-frame K and register the mold-slot accurately with the presented line.

*Pump mechanism.*—The construction of the pot L and the pump-actuating mechanism is shown in Figs. 2, 3, 4, 7, 8, 15, and 16. The metal within the pot L is maintained in molten condition by any suitable means—such, for instance, as the burners 236, shown in Fig. 4. The pot L is also provided with an outlet 237 to permit the escape of gases, &c. At the proper time the metal is ejected through the channel 238 and pot-mouth 101 into the mold 100 by the plunger 240 in the manner well understood in the art. The plunger 240 is actuated by the rod 241 and lever 242, which is fulcrumed at one end 243 to the pot-frame and at the other end to a vertically-movable rod 244. A spiral spring 245 surrounds the rod 244 and is connected to it at its upper end, the lower end of the spring being secured at 246 to the framework of the machine. The normal tendency of the spring 245 through the parts described is to depress the plunger 240 and eject the metal. This tendency is resisted and controlled by the cam 251 on cam-shaft 192, which acts upon roller 250 of the cam-lever 249. The cam-lever 249 is loosely mounted on the transverse shaft 293 and is connected by a pin 252 to a slot formed in the piece 248, fast upon the lower end of the rod 244. The cam 251 is circular in its general outline, except that a depression 253 is formed therein at one portion of its periphery. Normally the roller 250 rests upon the unbroken portion of the cam 251, thereby holding the rod 244 and plunger 240 in their elevated and inoperative positions. When the cam-shaft 192 is actuated, the cam 251 rotates until the roller 250 enters the depression 253, thus permitting the action of the spring 245 through the connected parts to depress the plunger 240 and eject the metal. (See Fig. 15.) The pin 252 on the cam-lever 249 projects inwardly through the slot in the piece 248 and beyond it. When the plunger 240 is in its upper and inoperative position, the pin 252 is also elevated. (See Fig. 2.) If at this time an under-set line be at the casting point or no line at all be presented, the excessive elevation of the justifying-bar 99, through the parts previously described, swings the arm 207 and its projecting portion 208 beneath the pin 252, (see Fig. 16,) thus preventing the action of the spring 245, notwithstanding the fact that the depression 253 of cam 251 is presented opposite the roller 250 on cam-lever 249. It will thus be seen that the casting mechanism is arrested and squirts prevented in the event of an under-set line. I have previously described mechanism connected to the locking-jaw 84, whereby the starting of the casting and other automatic operations is prevented in the event of an over-set line.

As shown in Fig. 16ª, I preferably form the pot-mouth 101 with grooves 1001 in order to cast projecting fins upon the slug, which assist in withdrawing it from the matrices and also hold it in the mold 100 while its base is being dressed, as hereinafter described.

*Mold-turning mechanism.*—As previously indicated, a second or rotational motion is also imparted to the mold-frame K, and the mechanism for securing this result is illustrated in Figs. 3, 7, 8, 11, 14, and 17. The mold when at rest occupies the position shown in Figs. 3 and 7, in the same plane as the casting position, but slightly retracted. After the slug has been cast it turns to the ejecting position, as shown in Fig. 17, from which it subsequently returns to that shown in Fig. 7. This partial rotation of the mold-frame K is transmitted thereto by the pinion 267, fast on the sleeve 214. A rack 268 gears into the pinion 267 and is given a reciprocating movement properly timed to secure the rotation of the mold-frame K and its subsequent return. The rack 268 is supported and guided at the lower end by a yoke 269, which embraces the cam-shaft 192 and near its upper end is maintained in engagement with the pinion 267 by the flanged guiding-roll 270. The rack 268 is provided with two cam-rolls—an upper one 271, whereby the rack is elevated at the proper time, and a lower one 272, whereby its return movement is effected. The upper roll 271 is located in position to be engaged and elevated by the cam-piece 273 of cam-wheel 297 on cam-shaft 192, and the roll 272 is located on the other side of the rack 268 in position to be engaged and depressed by the cam-piece 274 of cam-wheel 221 on the cam-shaft 192. I have thus provided a certain and positive means for effecting the rotation of the mold-frame K to its several operative positions. It is to be noted at this point that the mold and connected devices are always accessible to the operator without disarrangement of the other parts of the machine. The mold 100 may be readily removed and another one substituted therefor, as it is held in position simply on the frame K by the screws 266 266, (see Fig. 7,) thus permitting a rapid change in the length and body of the slug.

*Slug-dressing means.*—The operation of dressing or trimming the base of the slug is accomplished as the mold-frame turns to its ejecting position, as illustrated in Figs. 3, 17, and 28. The rear of the mold 100 has a lip which, in effect, forms a longitudinal groove 279, with which the pot-mouth 101 engages during the casting operation. After the pot-mouth is removed therefrom and as the mold-frame K turns to its ejecting position the knife R enters the groove 279 and is guided thereby during the passage of the mold 100 and trims the base of the slug accurately and evenly, so as to insure what are known in the art as "type-high" characters. The knife R is pivotally mounted at 280 on the short shaft 282, and a flat spring 281 bears against it to maintain it in position within the groove 279. The shaft 282 is mounted to rotate in the bracket 289 and is surrounded by a spiral spring 283, which is connected thereto at one end and at its other end to the frame of the machine. The partial rotation of the shaft 282 against the force of spring 283 permits the necessary change of position of the knife R in the groove 279, due to the rotational movement of the mold-frame K.

The devices described obviate entirely the necessity for adjustment of the knife, and hence simplify its form and render its grinding easy and infrequent.

*Ejecting mechanism.*—After the base of the slug has been trimmed by the knife R the mold comes to rest in the position shown in Fig. 17 in register with the ejector-blade S. The ejecting mechanism is illustrated in Figs. 3, 11, 14, 17, 28, 31, and 32. The blade S is detachably secured to the rod or plunger 288, mounted in the bracket 289, and is connected to the elbow-lever 290, (see Fig. 3,) which in turn is connected by the link or rod 291 to arm 292 on rock-shaft 293, near the base of the machine. A second arm 294 is mounted upon the shaft 293 and is provided with a cam-roll 295, which bears upon and is actuated by the cam 297 on cam-shaft 192. (See Fig. 11). The shaft 293 is surrounded by and secured to a spring 296, the other end of which bears against the machine-frame, whereby the roll 295 is kept in constant engagement with the surface of cam 297. (See Fig. 14.) The cam 297 is generally circular in outline, but is formed with two operative surfaces 298 and 299 to act upon the cam-roll 295. The parts are so arranged and timed that the extended cam-surface 298 first acts upon the cam-roll 295, and through the parts described the blade S partially ejects the slug Z from the mold and maintains it in position while the upper and lower edges thereof are trimmed by the knives T T. (See Fig. 31.) After this trimming operation is completed the abrupt cam portion 299 acts upon the cam-roll 295 and completely ejects the slug Z from the mold into the gripping device W, (see Fig. 32,) by which it is transferred to the galley Y. As the cam 297 continues its rotation the cam-roll 295 passes to the circular periphery thereof, and the spring 296 acts to withdraw the blade S from the mold. The mold-frame K then returns to its inoperative position, as shown in Fig. 7.

*Edge-trimming devices.*—As previously stated, while the slug Z is partially projecting from the mold 100 its lower and upper front edges are trimmed by the knives T T. The mechanism for accomplishing this result is shown in Figs. 1, 3, 14, 28, 29, 31, and 32. The knives T T—one for each edge of the slug—are mounted in a frame 305, slidingly supported upon the rod 304, and held and guided in proper position thereon by the engagement of a rear projection of the frame 305 with the fixed ledge 306. The knives T T are yieldingly mounted in the frame 305 by means of the springs 307 307, interposed between the knives T T and adjusting-screws on the frame 305. By this arrangement the knives T T are normally forced toward each other, but are capable of yielding sufficiently to permit the introduction of the slug Z between them. Each of the knives T T is provided on its front face with a plate 308, the plates 308 308 having straight edges, which under normal conditions are held in contact with each other by the springs 307 307. These straight edges of the plates 308 308 have bevel-corners 309 309 to admit the slug Z between them. When the slug Z is partially ejected from the mold 100, the frame 305 is moved along the rod 304, (see Figs. 29 and 31,) and the bevel-corners 309 309 of the plates 308 308 encounter and pass over the end thereof, the plates 308 308 and knives T T being forced outwardly against the springs 307 307 as the slug passes the bevel-corners 309 309 onto their straight edges. As the frame 305 continues its movement along the rod 304 the knives T T engage with and trim the upper and lower edges of the slug Z in immediate proximity to the characters thereon, thus removing any surplus metal and insuring the absolute parallelism of the slugs and their consequent assemblage in proper position for printing. The function of the plates 308 308 is two-fold—they serve to separate the knives T T, so that the slug Z may be introduced between them, and also, as they bear upon the inner body of the slug, they act as guides to control the position of the knives and to secure their accurate operation, and thus render it impossible to cut into or deface the printing-line on the edge of the slug. The passage of the frame 305 along the rod 304 and its subsequent return after the trimming of the slug are effected by an angle-arm lever, one branch of which, 310, is connected by a pin and slot to the frame 305, and the other branch of which, 311, is connected by a pin and slot to the vertical rod 312. (See Figs. 28 and 29.) The rod 312 (see Fig. 3) is located at the side of the machine, and a spring 313 is interposed between the frame and the rod. The function of the spring 313 is to assist in overcoming the abrupt inclines of the operating-cam 315. Near its lower end the rod 312 is provided with a cam-roll 314, which engages the cam-groove 315 in cam 199 upon the cam-shaft 192. The cam-groove 315 is so shaped that the frame 305, together with the knives T T, is moved positively along the edge of the slug Z to trim it in the manner already described, after which the frame 305 and knives T T are given a rapid return movement to their original and inoperative positions. As in the case of the base-trimming knife R, the knives T T are self-adjusting and require little or no attention and infrequent grinding.

*Slug-delivering means.*—As the slug Z is ejected from the mold 100 it is turned through an angle of ninety degrees and transferred by the device W to the galley Y. This mechanism is illustrated in Figs. 28, 31, and 32. The slug is received and held between the gripping-fingers 320 and 321, which are relatively movable about the pivot-shaft 322, carried by the frame 323. The frame 323 is mounted loosely upon the rod 325 and is connected thereto by the spiral spring 324. The fingers 320 are provided on the other side of the pivot-shaft 322 with an arm 326, which bears upon the frame 323, and thereby limits the motion of the fingers 320 in one direction. The fingers 321 are formed with an arm 327 on the opposite side of the pivot-shaft 322, between which and the fingers 320 a leaf-spring 329 is inserted, the tendency of which is to move the fingers 320 and 321 normally together. The arm 327 has two projecting pins, one, 328, at the end thereof and the other, 331, nearer the pivot-shaft 322. Two cam-pieces 332 and 333 are rigidly mounted upon the rod 325 in position to engage and act upon the pins 331 and 328, respectively, to open the jaw, as presently to be described. The pin 331 projects sufficiently beyond the cams 332 and 333 to engage a slot in the outer end of the lever 330, pivotally mounted upon the rod 325. The lever 330 in turn is connected by the link 334 to a piece 335 on the rod 336, which is mounted to slide in the frame 289. The rod 336 is connected by a piece 337 (see also Figs. 4 and 17) to the rod 288 of the ejector mechanism. Through the connections described the gripping mechanism W will be actuated to receive the ejected slug (see Fig. 32) and then to transfer it and deliver it to the galley Y. (See Figs. 28 and 31.)

The operation is substantially as follows: As the ejector-blade S advances the lever 330 is turned about the rod 325 and advances the clamping-fingers 320 and 321 to the position shown in Fig. 32, where they receive the ejected slug Z. At this time the pin 331 of arm 327 bears upon the cam 332, thus slightly compressing the spring 329 and opening the clamping-fingers 320 and 321 as the fingers 320 are maintained in fixed position by the engagement of their arm 326 with the frame-piece 323. The ejecting mechanism now makes its return movement, and the gripping device W is rotated about the rod 325, and the pin 331 passes out of engagement with the cam 332, thus permitting the spring 329 to clamp the slug firmly between the fingers 320 and 321. When the device W resumes its extreme outward position, (see Figs. 28 and 31,) the pin 328 is brought into engagement with the cam-piece 333, thus again compressing the spring 329 and opening the fingers 320 and 321 and permitting the slug Z to drop in upright position into the galley Y, as shown in dotted lines in Fig. 28. The spiral spring 324, connected to the frame 323, insures the engagement of the pins 328 and 331 with the cams 333 and 332 and, moreover, holds the entire device W in proper and firm relation with its operating-lever 330. I have thus provided a positive means for transferring the slug to the galley and one that cannot deface the characters thereof, due to the certain and automatic devices employed to open the clamping-jaw.

*Slug-assembling means.*—As the slug Z is transferred to the galley Y (see Figs. 28, 29, and 30) it is dropped in front of the reciprocable piece 342, and thereby moved forward, together with the previously-deposited slugs, so as to make room for the next one to be delivered. The piece 342 projects upward through the recess 343 and is connected to a rod or plunger 344, which is normally pressed outward by the spring 345, so as to hold the piece 342 against the abutment 346 of the framework and immediately behind the slug as delivered from the clamping device W. A bell-crank lever 347 (see Figs. 29 and 30) is connected at one end to the plunger 344, and the other end is located immediately above the upper extremity of the knife-operating rod 312, previously described. As the rod 312 ascends to actuate the knives T T it strikes the bell-crank lever 347, and thereby moves the shifting-piece 342 in such manner as to advance the slugs within the galley Y. When the knife-actuating rod 312 again descends, the spring 345 restores the shifting-piece 342 to its original position and in readiness to engage the next slug.

*Galley.*—The galley Y is constructed so as to be adjustable to different lengths of slugs. (See Figs. 1 and 3.) As the slugs Z are delivered and advanced therein they rest upon the rod 353 and against a traveling block 352, arranged to slide upon the rod. The rod 353 is mounted in a frame 356, which may be moved transversely on the rods 355 355, and an adjusting-screw 354 is provided, whereby the galley may be adapted to any desired size of slug.

*Power connections.*—Power is applied to the machine by a band-wheel 361, loosely mounted upon the transverse shaft 362. (See Figs. 1, 2, 3, 4, 7, and 14.) Upon the inner side of the band-wheel 361 is secured a clutch member 363, adapted to be engaged by the clutch member 364, which is splined to and movable upon the shaft 362, so as to actuate the latter when desired. A gear-wheel 365 is also connected to the pulley 361 and meshes into the pinion 366 upon the transverse shaft 367. A sleeve 369 (see Fig. 1) is mounted loosely upon the shaft 367 at its farther extremity and is provided with a clutch member 368, adapted to be engaged by the clutch member 370, which is splined to and movable upon the constantly-actuated shaft 367. Power may be transmitted to the clutch member 368 and sleeve 369 by the clutch member 370, through link 371 and foot-lever 373. The spring 372 tends normally to withdraw the clutch member 370 from the clutch member 368. When the machine is being operated, the attendant places his foot upon the lever 373, and motion is imparted to the keyboard, elevating, and distributing mechanism, &c., in the manner presently to be described. When he leaves his position at the machine, the spring 372 immediately breaks the connection. From the sleeve 369 power is transmitted by the sprocket-chain 374 to the short transverse shaft 375 beneath the keyboard. A bevel-pinion 376 upon the shaft 375 meshes into the bevel-pinion 65, which actuates the sleeve 62 and the line-transfer mechanism. The shaft 375 is provided at its outer end with a pulley 377, (see Fig. 2,) from which a crossed belt 378 imparts motion to the pulley 379, fast on the end of the shaft 12, thus operating the cylinder 11 of the keyboard mechanism, the cam 37 for the reciprocating rod 35, and the cam 19 for the tripping-plate 15. A pulley 380 is also secured upon the sleeve 369, (see Figs. 1 and 2,) which by the crossed belt 381 actuates the pulley 382 upon the shaft 383 near the top of the machine. The shaft 383 extends entirely across and behind the magazine C. In proximity to the pulley 382 it carries a pulley 384, which by the belt 385 imparts motion to the pulley 386 on the short shaft 169, thus actuating the distributing-chain P and the matrix-lifting device 160. The shaft 383 at its farther end (see Figs. 3ª and 4) is provided with a pulley 387, which by the belt 388 passing around the guide-pulley 389 operates the pulley 390 on the shaft 391, which carries sprocket-wheel 133, thus actuating the elevating-chain N and incidentally the other parts connected therewith, including the matrix-transfer slide O, the switches 142 and 143, and the clamping device 153.

The parts thus far described are actuated continuously—that is to say, so long as the operator depresses the foot-lever 373. The remaining functions of the machine are not continuous, but are caused intermittingly when the assembled line is delivered to the casting position and are initiated by the engagement of the clutch member 364 on the shaft 362 with the clutch member 363 of the band-wheel 361, as subsequently to be described. Motion is then imparted from the shaft 362 by the pinion 396 thereon (see Fig. 1) to the gear-wheel 397 upon the cam-shaft 192, (see Fig. 15,) which actuates the various devices already described in connection therewith. The gear-wheel 397 also meshes into the pinion 398 upon the transverse shaft 399. (See Figs. 1 and 15.) The shaft 399 carries a bevel-pinion 400, which meshes into a bevel-gear 401 (see Fig. 11) upon the vertical shaft 126, thus actuating the several cams 124, 179, and 180 and the parts connected thereto.

*Starting mechanism.*—As previously described, the locking movement of the jaw 84 turns the sector 91 so as to release the spring-pressed bolt 93 to start the cam-shaft 192, the shaft 126, and the other devices connected therewith. The means for this purpose are illustrated in Figs. 1, 11, 12, 13, and 14. The clutch member 364 is controlled by a collar 406, fast upon the longitudinally-movable rod 407, and is normally under pressure from the spring 408 on the rod 407 to engage it with the clutch member 363 on the band-wheel 361. The rod 407 is provided with a projecting piece 409, which is connected by a pin-and-slot connection to the arm 410 on rock-shaft 411. At the outer end of the rock-shaft 411 at the front of the machine is mounted a foot-lever 412, and at the inner end of the rock-shaft 411 and projecting toward the side of the machine is mounted a foot-lever 413. It will be seen that the operation of either foot-lever 412 or 413 through the connections described moves the rod 407 longitudinally against the pressure of the spring 408, thus disengaging the clutch member 364 from the clutch member 363 and stopping the actuation of shaft 362 and the further parts connected thereto. Automatic means are also provided for retracting the rod 407 and disengaging the clutch members as follows: The rod 407 is provided with an internally-projecting piece 414 in position to be engaged by the cam-piece 415 of the cam-wheel 221 on cam-shaft 192. The cam-piece 415 is formed with a bevel-face to engage the projection 414 and move the rod 407 longitudinally and is connected by the slots and screws 416 416 to the cam-wheel 221 in such manner as to have a limited motion in relation thereto. A spring 417, mounted upon the cam-wheel 221 and bearing upon the rear end of cam-piece 415, holds the latter normally in its forward position. As the cam-piece 415 contacts with the projection 414 and disengages the clutch members the cam-shaft 192 is thereby instantly stopped, with the cam-piece 415 in engagement with the projection 414, and moved rearwardly against the spring 417. In order to permit the subsequent return of the rod 407 and the restarting of the cam-shaft 192, the cam-piece 415 must be released from engagement with the projection 414, and this is accomplished by the spring 417, which now overcomes the diminished resistance offered to the bevel-face of cam-piece 415 and acts to move it forward with relation to the cam-wheel 221, because of the slot-and-screw connection 416 416. The piece 409 on the opposite side from the projection 414 is formed with a notch or holding recess 418, which is engaged and held by the detent-arm 419, pivotally mounted on the rod 421, when the rod 407 is in its retracted or inoperative position. A bracket 420, projecting from the frame, is located in contiguity to the detent 419 and prevents lateral movement thereof when engaged with the notch 418. Also mounted upon the pivot-rod 421 is a sleeve 422, having two downwardly-projecting arms 423 and 424 and an upwardly-projecting arm 425. The arm 423 is connected to the loose arm 419 by a spiral spring 426 and is further provided with an adjustable abutment-screw 427, which limits its inward motion toward the arm 419. The arm 424 of sleeve 422 extends downwardly and rearwardly and is arranged to be operated upon by the cam-piece 431, located upon the cam-wheel 297 on cam-shaft 192. The upwardly-extending arm 425 is provided at its end with the operating-handle 428, detachably connected by the spring-actuated latch 429 to the starting-bolt 93. The spring 430, (see Fig. 11,) connected to the frame of the machine and to the arm 425, normally causes the engagement of the latch 429 with the bolt 93 and forces the latter against the sector 91 in the manner previously described.

The operation of the parts is substantially as follows: When the jaw 84 moves to its locking position, and thereby the sector 91 and corner 92 thereof are freed from engagement with the spring-pressed bolt 93, the latter is forced in and assumes the position shown in Fig. 11. The spring 430 in causing the inward motion of the arm 425 also swings the arms 423 and 424, connected to the sleeve 422, about the pivot-rod 421, and the stud 427 on the arm 423 engages the detent 419 and withdraws it from the notch 418, thus permitting the spring 408 to engage the clutch members 364 and 363 and initiate the operation of the cam-shaft 192. The cam-shaft now continues to rotate and causes the actuation of the several mechanisms dependent thereon. During its rotation the cam-piece 431 engages the arm 424 and effects the partial rotation of the sleeve 422, thus restoring the bolt 93 to its outer position, as shown in Fig. 12. The shaft 126 is so timed that before the cam-piece 431 has passed out of engagement with the arm 424 the sector 91 is moved into the path of the bolt 93, so that as the cam-piece 431 leaves the arm 424 the parts are still held in position, as shown. At this time also the arm 423 is moved to its rearward or normal position and through the spring 426 establishes a tension upon the detent-arm 419, which is now in contact with the flat side of the piece 409. (See Fig. 14.) When the cam-shaft 192 has about completed its rotation, the cam-piece 415 engages the projection 414, moving the rod 417 longitudinally, so as to disengage the clutch members 364 and 363 and stop the rotation of the cam-shaft. At this time the notch 418 is again engaged by the detent-arm 419, which is under tension by the spring 426. The spring 417 then moves the cam-piece 415 out of engagement with the projection 414, and the parts are at rest, as shown in Fig. 13.

The foot-levers 412 and 413 afford means whereby the cam-shaft 192 may be stopped at any time during its rotation, and upon the release of the foot-lever the rotation of the cam-shaft will begin anew. If it be desired to lock the parts against operation when the cam-shaft has been thus arrested, the spring-actuated latch 429 is disengaged from the bolt 93, then in its innermost position, and through the handle 428, arm 425, sleeve 422, arm 423, and spring 426 the detent-arm 419 is engaged with the locking-notch 418. Under these circumstances the latch 429 bears upon the outer end of the bolt 93, and thus resists the action of the spring 430. To restart the cam-shaft, it is necessary to manipulate the spring-actuated latch 429 to permit its reëngagement with the bolt 93, whereupon the spring 430 again withdraws the detent 419 from the locking-notch 418 and the rotation of cam-shaft 192 recommences. A further reason for the detachable connection of the handle 428 to the bolt 93 resides in the fact, as previously explained, that the latter has the additional function in its innermost position of engaging the edge 92 of the sector 91 and of thus locking the jaw 84. When the bolt 93 is in its outer position, the latch 429 may be similarly disengaged therefrom when desired and the handle 428 moved inwardly, so as to withdraw the detent 419 entirely out of engagement with the piece 409 or the notch 418.

The starting, stopping, and locking means which I have thus provided are simple in construction and operation and afford positive and certain automatic mechanism for the desired purposes in addition to permitting the manual variation thereof when desired.

The machine described is simple in operation and not liable in the slightest degree to derangement. Durability has been secured to a considerable extent because of the extremely slow movements and large bearing-surfaces of the working parts, while the wear upon matrices and spacers is greatly reduced, due to the careful and easy method of handling them. The machine occupies small floor-space and is generally compact and without complication. The several sections are complete in themselves and capable of individual construction and assemblage. The parts are few in number and easy and cheap to manufacture, and many of them are designed, primarily, to be produced from ordinary commercial stock without extensive machining or fitting. Others—such, for instance, as the elements of the keyboard mechanism—may be formed by stamping and by other simple expedients. I have thus reduced special castings and the more difficult problems of construction to a minimum. Moreover, the adjustments necessary are few in number, easy to effect, and the parts are always readily accessible to the operator, and, generally speaking, the machine has been designed to dispense with unnecessary complexity and delicacy and to render it especially desirable for operators of uncertain skill and mechanical knowledge.

Having thus described my invention, its construction, arrangement, and mode of operation, what I claim, and desire to secure by Letters Patent of the United States, is as follows:

1. In a typographic machine, escapement-operating means combined with an actuating device therefor, and a single device to effect the engagement of the said means with the actuating device and also to restore them to their original position.

2. In a typographic machine, in combination, escapement-operating means comprising a latch, an actuating device therefor, and independent means for disengaging the latch from its actuating device.

3. In a typographic machine, in combination, escapement-operating means comprising a latch, an actuating device therefor, and a reciprocating plate to disengage the latch from its actuating device.

4. In a typographic machine, in combination, the escapement-operating means comprising a latch, an actuating device therefor, means tending to engage the latch with the actuating device, and means to release the latch and permit its engagement therewith.

5. In a typographic machine, in combination, the escapement-operating means comprising a latch, an actuating device therefor, means tending to engage the latch with the actuating device, means to release the latch and permit its engagement therewith, and means for restoring the said releasing means to their original position.

6. In a typographic machine, in combination, the escapement-operating means comprising a latch, an actuating device therefor, means tending to engage the latch therewith, and a releasing-lever and knuckle for the latch.

7. In a typographic machine, in combination, the escapement-operating means comprising a latch, an actuating device therefor, means tending to engage the latch with the actuating device, and means to release the latch and permit its engagement therewith, together with an interponent located between the latch and the releasing means.

8. In a typographic machine, in combination, escapement-operating means having a single tooth and a continuously-rotating cylinder provided with a plurality of teeth to engage therewith.

9. In a typographic machine, the combination of a spacer-magazine with an escapement device arranged to act upon the lower portions of the spacers therein contained, the magazine being so formed as to prevent the longitudinal movement of the upper portions of said spacers.

10. In a typographic machine, the combination of a spacer-magazine, and a two-part spacer supported therein and held against longitudinal movement by one of its members, with an escapement device arranged to act upon the other member.

11. In a typographic machine, the combination of a spacer-magazine provided with an abutment against which the lower portions of the spacers rest with an escapement device to act upon the lower portions of the spacers and lift them clear of the abutment the upper portions being held against longitudinal movement.

12. In a typographic machine, the combination of a transfer device and a reciprocating pusher mounted therein in position to engage and advance the line as it is being assembled.

13. In a typographic machine, the combination of a line-transfer device, a suitably-actuated crank-arm, and connections from the crank-arm to the device.

14. In a typographic machine, the combination of a line-transfer device, actuating means therefor, and further means carried by the device to disconnect the actuating means from the device at the end of its movement.

15. In a typographic machine, the combination of a line-transfer device, a continuously-driven member, means for connecting them at will, and means to automatically disconnect them on the return of the transfer device.

16. In a typographic machine, the combination of a line-transfer slide, actuating devices therefor, and means for locking the said actuating devices in position during the movement of the slide.

17. In a typographic machine, the combination of a line-transfer slide, actuating devices therefor, and means for locking the said actuating devices in position during the movement of the slide, together with means for disengaging the said actuating devices at the end of its movement.

18. In a typographic machine, the combination of a line-transfer device and a line-confining jaw movable into the path of the line and actuated by the transfer device.

19. In a typographic machine, the combination of a jaw movable into the path of the line and normally in its retracted position to permit the delivery of the line to the casting mechanism with line-transfer means which act upon the jaw and move it into position to engage the end of the delivered line.

20. In a typographic machine, the combination of a jaw to engage the line in its casting position with a starting device which coöperates with and locks the jaw at this time.

21. In a typographic machine, the combination of starting mechanism and means normally tending to actuate said starting mechanism, with line-delivery devices which trip said actuating means and permit them to operate.

22. In a typographic machine, the combination of a jaw to engage the delivered line at the casting-point, with starting means, the whole being arranged so that the movement of the jaw to its operative position causes the operation of the starting means.

23. In a typographic machine, the combination of starting means and a line-confining jaw controlling the same, whereby the starting of the machine is prevented unless the line be properly confined.

24. In a typographic machine, the combination of a jaw to engage the delivered line with starting means, the whole being so connected and arranged that in the event of an over-set line being presented, the jaw will prevent the operation of the starting means.

25. In a typographic machine, the casting mechanism comprising in combination a confining-jaw movable into and out of the path of the line, means for moving the jaw to its operative position, and positively-actuated independent means for restoring the jaw to its inoperative position.

26. In a typographic machine, the casting mechanism comprising in combination a confining-jaw movable into and out of the path of the line and means connected thereto for easing the pressure of the jaw on the line after the casting operation and subsequently for restoring it to its inoperative position.

27. In a typographic machine, the combination of a confining-jaw movable into and out of the path of the line, with line-transfer mechanism whereby the jaw is moved to its operative position, and independent means for restoring the jaw to its inoperative position.

28. In a typographic machine, the casting mechanism provided with a mold and an independent jaw to engage the forward end of a line, the said jaw being displaceable out of the path of the line combined with means to transfer the line beyond the casting position.

29. In a typographic machine, the casting mechanism provided with a mold and two independent jaws to engage the ends of a line, the said jaws being both movable into and out of the path of the line combined with means to transfer the line beyond the casting position.

30. In a typographic machine, the casting mechanism provided with a mold and two independent jaws to engage the ends of a line, the said jaws being independently movable into and out of the path of the line.

31. In a typographic machine, the combination of line-supporting means a mold and two independent line-confining jaws movable independently to and from the path of the line.

32. In a typographic machine, the casting mechanism comprising a mold and two independent jaws to engage the ends of the line, the said jaws being movable into and out of operative position independently of each other and in different planes.

33. In a typographic machine, the combination of line-elevating means and casting mechanism, the latter being provided with a mold and an independent jaw to engage the end of a line and movable from its operative position to permit the transfer of the line from the casting mechanism to the elevating means.

34. In a typographic machine, the casting mechanism comprising a movable jaw to engage the end of a line during casting combined with means to move the jaw vertically into and out of its operative position.

35. In a typographic machine, the casting mechanism comprising a jaw movable into and out of the path of the line to confine it during casting, combined with means to move the jaw, the jaw being adjustably connected to its operating means to permit the length of line to be varied at will.

36. In a typographic machine, in combination, means to sustain the line of matrices at the casting-point and distinct means to support the spacers therein and to remove them therefrom.

37. In a typographic machine, the combination of matrices and circulating spacers with means for separating the spacers and matrices at the casting-point.

38. In a typographic machine, and in combination with casting mechanism, means for lifting the spacers from the line at the casting-point.

39. In a typographic machine, and in combination with casting mechanism, a single means for supporting the spacers at the casting-point and for removing them from the line at the casting-point.

40. In a typographic machine, and in combination with casting mechanism, a device for supporting the spacers at the casting-point, together with a jaw connected to the said device to engage the end of the line.

41. In a typographic machine, and in combination with casting mechanism, a device for supporting the spacers at the casting-point, and a jaw connected to the said device to engage the end of the line, together with means for actuating the said device to remove the spacers from the line and the jaw from its operative position.

42. In a typographic machine, and in combination with a spacer-magazine and the casting mechanism, a suitably-actuated device to receive and hold the spacers at the casting-point and then to convey them to the magazine.

43. In a typographic machine, and in combination with a spacer-magazine, means for removing the spacers from the line at the casting-point, and further means to restore them to the magazine.

44. In a typographic machine, means for advancing a composed line of matrices and spacers endwise to the casting-point, combined with means for separating the matrices and spacers at the casting-point.

45. In a typographic machine, means for advancing a composed line of matrices and spacers endwise to the casting-point, combined with means for removing the spacers from the matrices at the casting-point.

46. In a typographic machine, and in combination with casting mechanism, a spacer-restoring device, and actuating means therefor, including a detachable connection whereby the device may be left in its casting position.

47. In a typographic machine, a spacer-restoring device provided with two sets of grooves to engage the ears of the spacers and switches normally connecting the grooves.

48. In a typographic machine, the combination of assembling, casting and elevating mechanisms, constructed and arranged with the assembling, casting and elevating positions in line.

49. In a typographic machine, the combination of assembling, casting and elevating mechanisms, constructed and arranged with the assembling, casting and elevating positions in line, together with means for transferring the assembled line from the assembling to the casting position, and from the casting to the elevating position.

50. In a typographic machine, the combination of assembling, casting and elevating mechanisms, constructed and arranged with the assembling, casting and elevating positions in line, together with jaws movable into and out of the path of the assembled line to hold the latter in the casting position.

51. In a typographic machine, the combination of casting and distributing mechanisms, constructed and arranged with the casting and distributing positions in line, together with an independent displaceable jaw to engage the end of the assembled line at the casting-point.

52. In a typographic machine, the combination of assembling, casting and elevating mechanisms, constructed and arranged with the assembling, casting and elevating positions in line, together with means for advancing the assembled line from one position to another, and two line-confining jaws movable into and out of its path.

53. In a typographic machine, the combination of assembling, casting and elevating mechanisms, constructed and arranged with the assembling, casting and elevating positions in line, together with means for advancing the assembled line to and beyond the casting position, and a retractile jaw to confine it in the casting position.

54. In a typographic machine, the combination of elevating devices and means to separate the spacers from the line at the casting-point with means to move the remaining matrices to the elevating devices.

55. In a typographic machine, elevating means for the matrices comprising a channel to support the matrices and a suitably-actuated device to engage behind and move juxtaposed matrices therein.

56. In a typographic machine, elevating means for the matrices comprising a channel to support the matrices and a suitably-actuated chain to move a line of matrices therein.

57. In a typographic machine, elevating means for the matrices comprising a channel and a suitably-actuated chain provided with a pivoted projection so as to conform to the curvature of the channel and move the matrices therein.

58. In a typographic machine, elevating devices for the matrices combined with suitable actuating means therefor comprising a yielding connection and a stop to interrupt their operation.

59. In a typographic machine, elevating devices for the matrices and suitable actuating means therefor comprising a yielding connection, in combination with a stop for said elevating devices which is disengaged by the delivery of the matrices thereto.

60. In a typographic machine, elevating means for the matrices comprising a supporting-channel therefor, the channel being so curved and located that the juxtaposed matrices are delivered to the distributing position in the same relation they occupied at the casting-point.

61. A typographic machine, provided with two channels to support the matrices, one wherein the line is held during the casting operation, and the other through which the matrices pass to the distributing position, the latter being in effect a continuation of the former.

62. A typographic machine provided with a continuous supporting-track for the composed line of matrices from the assembling position to the distributer.

63. A typographic machine provided with a continuous supporting-track for the matrices from the assembling position to the casting and elevating positions.

64. In a typographic machine, a distributing-box provided with a movable piece or switch to admit the matrices thereto.

65. In a typographic machine, a distributing-box arranged to receive the matrices in one direction and to permit their passage in the reverse direction to the distributing devices.

66. In a typographic machine, a distributing-box arranged to receive the matrices in one direction and to permit their passage in the reverse direction to the distributing devices, combined with means respectively to deliver the matrices to the box and to remove them therefrom.

67. In a typographic machine, the combination of a distributing-box, means for delivering the matrices thereto, and a movable piece or switch to permit the passage of the delivering means from the box.

68. In a typographic machine, means for transferring the matrices from the elevating to the distributing devices combined with means for clamping the other end of the line during the transferal.

69. In a typographic machine, means for transferring the matrices from the elevating to the distributing devices combined with means for clamping the other end of the line during the transferal, the said clamping means being arranged to move into and out of the path of the matrices.

70. In a typographic machine, the combination with the distributer-bar of a suitably-actuated chain to convey the matrices along the bar, the said chain being formed of links each provided with two edges, one of which bears against the matrix to maintain it in proper position, and the other of which bears against the edge of the subsequent link.

71. In a typographic machine, the combination with the distributer-bar of a suitably-actuated chain, the said chain being formed of links which straddle the bar and rest thereon.

72. In a typographic machine, the combination with the distributer-bar of a suitably-actuated chain, the said chain being arranged in relation to the bar so as to be guided thereby.

73. In a typographic machine, the combination with the distributer-bar of a suitably-actuated chain resting thereon.

74. In a typographic machine, and in combination with the casting mechanism, the matrices formed with projections at their upper portions whereby they are supported and with projections at their lower portions together with a suitably-actuated alining-piece to engage and depress them.

75. In a typographic machine, and in combination with the casting mechanism, an alining-piece and suitable actuating means therefor, together with adjustable connections between the piece and its actuating means.

76. In a typographic machine, and in combination with the casting and justifying mechanisms, an alining-piece for the matrices, and suitable actuating means therefor, the said actuating means being so constructed as to permit a slight relaxation of the alining action during the operation of justification.

77. In a typographic machine, and in combination with the pump actuating and justifying mechanisms, a device carried by the pot-supports and connections to the justifying mechanism to arrest the pump action in the event of an underset line.

78. In a typographic machine, and in combination with the pump actuating and justifying mechanisms, a device arranged in the path of the justifying mechanism, and a shaft provided with two arms and mounted on the pot-supports, whereby in the event of an underset line the device is moved by the justifying mechanism to engage with one of the arms and thereby the other arm is moved to arrest the pump action.

79. In a typographic machine, and in combination with the justifying mechanism, a movable mold and means for advancing the mold to the presented line, the said means comprising a device whereby the mold is slightly retracted during the justification.

80. In a typographic machine, and in combination with the mold and justifying mechanism, a movable pot and means for advancing the pot to the mold, the said means comprising a device whereby the pot is slightly retracted during the justification.

81. In a typographic machine, and in combination with justifying mechanism, means for locking the line edgewise of the matrices, releasing it during justification, and then relocking it.

82. In a typographic machine, and in combination with justifying mechanism, means for locking the line edgewise of the matrices, releasing it during the advance of the wedges, and then relocking it.

83. In a typographic machine, the combination with the mold of the pot, the mouth of the latter being formed with longitudinally-extending lateral grooves.

84. In a typographic machine, in combination, an oscillating mold, a pinion connected thereto and a reciprocating rack to move the mold in both directions.

85. In a typographic machine, in combination, an oscillating mold, a pinion connected thereto, a rack meshing with the pinion, and two cams whereby the rack is operated positively in both directions.

86. In a typographic machine, in combination, a mold and a yieldingly-mounted trimming-knife located in proximity thereto whereby the base of the slug is dressed during the movement of the mold, the mold being so formed as to insure the engagement of the knife therewith in proper position to trim the slug.

87. In a typographic machine, in combination, a mold and a yieldingly-mounted trimming-knife located in proximity thereto whereby the base of the slug is dressed during the movement of the mold, the mold being formed with a groove to insure the engagement of the knife therewith in proper position to trim the slug.

88. In a typographic machine, in combination, a pair of trimming-knives yieldingly mounted so as to admit the slug between them and suitable actuating devices therefor, the said knives being provided with guiding means to bear upon the body of the slug.

89. In a typographic machine, in combination, a pair of trimming-knives yieldingly mounted so as to admit the slug between them and suitable actuating devices therefor, the said knives being provided with plates to bear upon the body of the slug, and the plates being formed with bevel corners.

90. In a typographic machine, a trimming-knife provided with guiding means therefor to bear upon the body of the slug.

91. In a typographic machine, a suitably-actuated movable trimming-knife provided with guiding means to bear upon the body of the slug.

92. In a typographic machine, suitably-actuated slug-transfer means to receive the slug at the ejecting-point and to positively hold and deliver it to the galley.

93. In a typographic machine, suitably-actuated slug-transfer means to grasp the slug and convey it to the galley.

94. In a typographic machine, suitably-actuated slug-transfer means provided with jaws and means to open and close the jaws.

95. In a typographic machine, the combination of the distributing means and elevating means, the latter being connected to the former and operated thereby.

In testimony whereof I have subscribed my name to this specification in the presence of two attesting witnesses.

FRED EUGENE BRIGHT.

In presence of—
    THEO. H. M'CALLA,
    JOHN S. BARHAM.